United States Patent
Riman et al.

(10) Patent No.: US 9,095,815 B2
(45) Date of Patent: *Aug. 4, 2015

(54) SYSTEMS AND METHODS FOR CAPTURE AND SEQUESTRATION OF GASES AND COMPOSITIONS DERIVED THEREFROM

(71) Applicant: Rutgers, The State University of New Jersey, New Brunswick, NJ (US)

(72) Inventors: Richard E. Riman, Belle Mead, NJ (US); Vahit Atakan, West Windsor, NJ (US)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/275,253

(22) Filed: May 12, 2014

(65) Prior Publication Data
US 2014/0308507 A1    Oct. 16, 2014

Related U.S. Application Data

(60) Continuation of application No. 12/984,332, filed on Jan. 4, 2011, now Pat. No. 8,721,784, which is a division of application No. 12/271,566, filed on Nov. 14, 2008, now Pat. No. 8,114,367.

(60) Provisional application No. 60/988,122, filed on Nov. 15, 2007.

(51) Int. Cl.
C04B 12/00 (2006.01)
B01D 53/62 (2006.01)
(Continued)

(52) U.S. Cl.
CPC ............. B01D 53/62 (2013.01); B01D 53/73 (2013.01); C01D 7/07 (2013.01); C01F 11/18 (2013.01);
(Continued)

(58) Field of Classification Search
CPC .................. C04B 12/00; C04B 2111/00017
USPC .................................... 106/713, 738
See application file for complete search history.

(56) References Cited

U.S. PATENT DOCUMENTS 3,632,624 A    1/1972  Anderson
4,350,567 A    9/1982  Moorehead et al.
(Continued)

FOREIGN PATENT DOCUMENTS

BE    1006908 A3    1/1995
EP    1142629 A1    10/2001
(Continued)

OTHER PUBLICATIONS

Monkman et al., "Assessing the Carbonation Behavior of Cementitious Materials", Journal of Materials in Civil Engineering, Nov. 2006, pp. 768-776.
(Continued)

*Primary Examiner* — Paul Marcantoni
(74) *Attorney, Agent, or Firm* — McKenna Long & Aldridge LLP

(57) ABSTRACT

A composition is produced by a hydrothermal liquid phase sintering process, and the process includes providing a porous matrix, the porous matrix having a shape, and allowing a component of the porous matrix to undergo a reaction with an infiltrating medium to form a first product, the infiltrating medium including a greenhouse gas, a remainder of the porous matrix acting as a scaffold for facilitating the formation of the first product. The composition includes the first product and the reminder of the porous matrix. The composition has a microstructure that resembles a net-like interconnecting network. The composition maintains the shape of the porous matrix. The composition is free of hydraulic bonds.

6 Claims, 15 Drawing Sheets

(51) Int. Cl.
  *B01D 53/73*  (2006.01)
  *C01D 7/07*  (2006.01)
  *C01F 11/18*  (2006.01)
  *C04B 40/02*  (2006.01)

(52) U.S. Cl.
  CPC ......... *C04B 40/0236* (2013.01); *C04B 40/0268* (2013.01); *B01D 2251/404* (2013.01); *B01D 2257/504* (2013.01); *Y02C 10/04* (2013.01)

(56) References Cited

U.S. PATENT DOCUMENTS

| | | |
|---|---|---|
| 4,501,618 A | 2/1985 | Gebhard et al. |
| 4,595,465 A | 6/1986 | Ang et al. |
| 5,252,127 A | 10/1993 | Pichat |
| 5,298,475 A | 3/1994 | Shibata et al. |
| 5,395,561 A | 3/1995 | Ukawa et al. |
| 5,502,021 A | 3/1996 | Schuster |
| 5,518,540 A | 5/1996 | Jones, Jr. |
| 5,650,562 A | 7/1997 | Jones, Jr. |
| 5,769,940 A | 6/1998 | College |
| 5,779,464 A | 7/1998 | Fan et al. |
| 5,830,815 A | 11/1998 | Wagh et al. |
| 5,897,702 A | 4/1999 | Thomson et al. |
| 5,958,353 A | 9/1999 | Eyal |
| 5,965,201 A | 10/1999 | Jones, Jr. |
| 5,987,704 A | 11/1999 | Tang |
| 5,997,629 A | 12/1999 | Hills |
| 6,271,172 B2 | 8/2001 | Ohashi et al. |
| 6,447,437 B1 | 9/2002 | Lee et al. |
| 6,648,551 B1 | 11/2003 | Taylor |
| 6,787,023 B1 | 9/2004 | Mohr et al. |
| 7,067,456 B2 | 6/2006 | Fan et al. |
| 7,125,530 B2 | 10/2006 | Biedenkopf et al. |
| 7,132,090 B2 | 11/2006 | Dziedzic et al. |
| 7,141,093 B2 | 11/2006 | Charette |
| 7,314,847 B1 | 1/2008 | Siriwardane |
| 7,390,444 B2 | 6/2008 | Ramme et al. |
| 7,399,339 B2 | 7/2008 | Fan et al. |
| 7,618,606 B2 | 11/2009 | Fan et al. |
| 7,666,374 B2 | 2/2010 | Grochowski |
| 7,722,842 B2 | 5/2010 | Park et al. |
| 7,753,618 B2 | 7/2010 | Constantz et al. |
| 7,795,175 B2 | 9/2010 | Olah et al. |
| 7,820,591 B2 | 10/2010 | Ryu et al. |
| 2004/0213705 A1 | 10/2004 | Blencoe et al. |
| 2006/0185560 A1 | 8/2006 | Ramme et al. |
| 2007/0149398 A1 | 6/2007 | Jones et al. |
| 2008/0245274 A1 | 10/2008 | Ramme |
| 2009/0020044 A1 | 1/2009 | Constantz et al. |
| 2009/0081093 A1 | 3/2009 | Comrie |
| 2009/0104349 A1 | 4/2009 | Hills et al. |
| 2009/0142578 A1 | 6/2009 | Riman et al. |
| 2009/0304566 A1 | 12/2009 | Golden et al. |
| 2010/0024686 A1 | 2/2010 | Constantz et al. |
| 2010/0132549 A1 | 6/2010 | Yaghi et al. |
| 2010/0132591 A1 | 6/2010 | Constantz et al. |
| 2010/0135882 A1 | 6/2010 | Constantz et al. |
| 2010/0247410 A1 | 9/2010 | Constantz et al. |

FOREIGN PATENT DOCUMENTS

| | | | |
|---|---|---|---|
| JP | 2001253785 A | | 9/2001 |
| JP | 2006213559 | | 8/2006 |
| WO | 2005070521 A1 | | 8/2005 |
| WO | 2007106883 A2 | | 9/2007 |
| WO | 2009132692 A1 | | 11/2009 |
| WO | 2009133120 A2 | | 11/2009 |

OTHER PUBLICATIONS

Monkman et al., "Carbonated Ladle Slag Fines for Carbon Uptake and Sand Substitute", Journal of Materials in Civil Engineering, Nov. 2009, pp. 657-665.
Monkman et al., "Carbonation Curing of Slag-Cement Concrete for Binding CO2 and Improving Performance", Journal of Materials in Civil Engineering, Apr. 2010, pp. 296-304.
Liu et al., "Development of CO2 solidification method for recycling autoclaved lightweight concentrate waste", Journal of Material Science Letters in Civil Engineering, 2001, pp. 1791-1794.
Teramura et al, "New Building Material from Waste Concrete by Carbonation", Journal of Material Civil Engineering, Nov. 2000, pp. 288-293.
Shiomi et al., "Effect of Mechano-Chemical Treatment on Consolidation of CaSiO3 by Carbonation", J. Soc. Mat. Sci., Japan, vol. 51, No. 6, pp. 610-616, Jun. 2002.
Nakamura et al., "High Temperature Deformation and Dislocation Structure of a-Al2O3 Single Crystals", J. Soc. Mat. Sci., Japan, vol. 51, No. 6, pp. 617-621, Jun. 2002.
SciFinder Scholar database searched under "Cement-Carbonate-Carbon Dioxide", Jun. 29, 2007 pp. 1-993.
SciFinder Scholar database searched under "Hydrothermal Sintering", Aug. 23, 2007 pp. 1-16.
SciFinder Scholar database searched under "Carbon Dioxide in Cement", Oct. 10, 2007 pp. 1-2.
SciFinder Scholar database searched under "Cements/Geopolymers_Czech", Oct. 10, 2007 pp. 1- 5.
SciFinder Scholar database searched under "Geopolymers and Carbon Dioxide", Oct. 10, 2007 pp. 1-8.
SciFinder Scholar database searched under "Geopolymers", Oct. 10, 2007 pp. 1-9.
SciFinder Scholar database searched under "Carbon Capture and Amine Sorbents", Jan. 3, 2008, pp. 1-70.
SciFinder Scholar database searched under "Carbon Capture and Calcium Carbonate", Jan. 3, 2008, pp. 1-31.
SciFinder Scholar database searched under "Carbon Capture and Calcium Sulfate", Jan. 3, 2008, pp. 1-6.
SciFinder Scholar database searched under "Carbon Capture and Ammonium Carbonate", Jan. 3, 2008, pp. 1-4.
SciFinder Scholar database searched under "C02 Capture, Carbonates and Chloride", Jan. 3, 2008, pp. 1-13.
SciFinder Scholar database searched under "Carbon Capture and Carbonates", Jan. 3, 2008, pp. 1-88.
SciFinder Scholar database searched under "Carbon Capture and FeCO3", Jan. 3, 2008, pp. 1-2.
SciFinder Scholar database searched under "Carbon Capture and Hydrothermal", Jan. 3, 2008, pp. 1-3.
SciFinder Scholar database searched under "Carbon Capture and Oxalate", Jan. 3, 2008, pp. 1-2.
SciFinder Scholar database searched under "Carbon Capture and Sequestration", Jan. 3, 2008, pp. 1-132.
SciFinder Scholar database searched under "Carbon Capture and Sintering", Jan. 3, 2008, pp. 1-61.
SciFinder Scholar database searched under "Carbon Capture and solid sorbents", Jan. 3, 2008, pp. 1-32.
SciFinder Scholar database searched under "Carbon Capture and Storage", Jan. 3, 2008, pp. 1-128.
SciFinder Scholar database searched under "Carbon Capture and MgC03", Jan. 4, 2008, pp. 1-3.
SciFinder Scholar database searched under "Oxalate-electrochemical", Jan. 14, 2008, pp. 1-2.
SciFinder Scholar database searched under "Oxalate for Sequestration", Jan. 14, 2008, pp. 1-4.
SciFinder Scholar database searched under "Oxalate—Texaco", Jan. 14, 2008, pp. 1-4.
SciFinder Scholar database searched under "Solar Oxalate", Jan. 14, 2008, pp. 1-2.
SciFinder Scholar database searched under "Carbonation of Concrete, restricted to 2000 and on", Jan. 21, 2008, pp. 1-417.
SciFinder Scholar database searched under "Slag and Carbon Dioxide", Jun. 17, 2008, pp. 1-768.
SciFinder Scholar database searched under "Slags-Carbon Dioxide-Construction Materials", Jun. 17, 2008, pp. 1-95.
SciFinder Scholar database searched under "Lime Cement—Carbon Dioxide", Jul. 2, 2008, pp. 1-98.
SciFinder Scholar database searched under "Hills—all papers", Nov. 30, 2010, pp. 1-27.

(56) References Cited

OTHER PUBLICATIONS

SciFinder Scholar database searched under "Hills", Nov. 30, 2010, pp. 1-13.
SciFinder Scholar database searched under "Teramura limited to carbonate", Nov. 30, 2010, pp. 1-11.
SciFinder Scholar database searched under "Teramura Work", Nov. 30, 2010, pp. 1-34.
SciFinder Scholar database searched under "Carbon Capture and Amine and MEA", Jan. 3, 2008, pp. 1-20.
SciFinder Scholar database searched under "Carbon Capture and K2CO3", Jan. 3, 2008, pp. 1-12.
SciFinder Scholar database searched under "Carbon Capture Na2C03", 101/03/2008, pp. 1-15.
SciFinder Scholar database searched under "Solidification of McC03", Jan. 4, 2008, pp. 1-2.
Klaus S. Lackner, "Carbon dioxide disposal in carbonate minerals", Energy Pergamon Press, Oxford, GB, vol. 20, No. 11, Jan. 1, 1995.
Office Action of Korean Patent Office in Application No. KR 10-2010-7012536, dated Feb. 26, 2015.

SYSTEMS AND METHODS FOR CAPTURE AND SEQUESTRATION OF GASES AND COMPOSITIONS DERIVED THEREFROM

RELATED APPLICATION

This application is a Continuation Application of U.S. nonprovisional application Ser. No. 12/984,332, filed on Jan. 4, 2011, now U.S. Pat. No. 8,721,784, issued on May. 13, 2014, which is a Divisional Application of U.S. nonprovisional application Ser. No. 12/271,566, filed on Nov. 14, 2008, now U.S. Pat. No. 8,114,367, issued on Feb. 14, 2012, which claims priority to U.S. provisional patent application Ser. No. 60/988,122, on filed Nov. 15, 2007, all of which are herein incorporated by reference in their entirety.

BACKGROUND

Global warming has received increasing attention owing to greater acceptance of proposed theories, which include the increasing release of carbon dioxide, a green house gas. Global releases of carbon dioxide was 49 billion tons in 2004, which was an 80% increase over 1970 levels. The emissions of carbon dioxide in 2005 in the USA alone was 6.0 billion metric tons. Materials in the construction industry, such as steel and cement, generate carbon dioxide, among other toxic and/or greenhouse gases, at very significant levels. In 2002, the EPA estimates that cement production accounts for 5 wt % of the world production of carbon dioxide and ties the steel industry for being the most significant industrial contributors of carbon dioxide. Carbon dioxide release is attributed to three components: First, limestone decomposition, where calcium carbonate is calcined (heated) to CaO. Second, energy (about 5 million BTU/metric ton of cement) is needed to heat (drive) the endothermic limestone decomposition. Third, electrical energy needed for driving process equipment such as the rotary calciner and milling equipment. In sum, for every ton of cement produced, 1.08 tons of carbon dioxide are generated.

Also, conventional ceramic making involves high temperature processes such as calcining and sintering. The raw materials are frequently rendered reactive for materials manufacturing by powder processes such as milling, where ceramic fragments, called clinker in the cement industry, are ground from a centimeter size to a micron size. Even processes such as these are energy intensive. In 1980, milling processes for ceramic chemicals accounted for about 0.5% of the nations energy consumption.

Thus, a need exists for a better systems and/or methods for making a ceramic that can also minimize the carbon footprint, or even capture and/or sequester the greenhouse gases generated during production.

Furthermore, the post-combustion capture of $CO_2$ (PCC) from flue-gas remains a challenge. For example, problems such as backpressures can limit the output of a power plant. Further, the capture process is frequently limited by the conditions of the combustion, which are determined by the chemistry of the fuel being burned as well as the selected combustion conditions. For example, amine-based capture methods require low temperatures for high $CO_2$ capture efficiency, which introduces energy costs for cooling the flue gas and a $CO_2$ footprint associated with the energy.

Thus, a need exists to establish a method that can operate over a wide range of fuel and combustion conditions without any efficiency penalty to the manufacturing concern using that combustion process, remove all of the $CO_2$ in the gas stream in an economical fashion, consume $CO_2$ when all contributions to $CO_2$ generation have been considered, process materials at a cost that can be recovered by the sale of the commodities, and supply $CO_2$ in a soluble form.

SUMMARY OF THE INVENTION

One embodiment provides a method of sequestering a greenhouse gas comprising: (i) providing a solution carrying a first reagent that is capable of reacting with a greenhouse gas; (ii) contacting the solution with a greenhouse gas under conditions that promote a reaction between the at least first reagent and the greenhouse gas to produce at least a first reactant; (iii) providing a porous matrix having interstitial spaces and comprising at least a second reactant; (iv) allowing a solution carrying the at least first reactant to infiltrate at least a substantial portion of the interstitial spaces of the porous matrix under conditions that promote a reaction between the at least first reactant and the at least second reactant to provide at least a first product; and (v) allowing the at least first product to form and fill at least a portion of the interior spaces of the porous matrix, thereby sequestering a greenhouse gas. Reacting can include, for example, dissolution, ion addition, ion substitution, precipitation, disproportionation, or combinations thereof.

Another embodiment provides a ceramic produced by a carbon capturing, carbon sequestering process, or a combination thereof, which process comprises allowing at least one component of a porous matrix to undergo a reaction with at least a first reactant carried by a infiltrating medium to provide at least a first product, during which reaction a remainder of the porous matrix acts as a scaffold for facilitating the formation of the first product from the reaction mixture, thereby producing a ceramic.

In another embodiment, a method of making a ceramic is provided, the method comprising: (i) providing a porous matrix having interstitial spaces and comprising at least a first reactant; (ii) contacting the porous matrix with an infiltrating medium that carries at least a second reactant, which comprises a greenhouse gas; (iii) allowing the infiltrating medium to infiltrate at least a portion of the interior spaces of the porous matrix under conditions that promote a reaction between the at least first reactant and the at least second reactant to provide at least a first product; and (iv) allowing the at least first product to form and fill at least a portion of the interstitial spaces of the porous matrix, thereby producing a ceramic, wherein the method consumes and does not release significant amounts of greenhouse gas.

One embodiment provides a cement comprising substantially no hydraulic bond. A hydraulic bond can be generally referred to as a water-mediated bond, such as a bond involving at least a water molecule or a portion thereof. For example, it can be a hydrogen bond.

Another embodiment discloses a ceramic comprising ceramic bond, wherein the ceramic comprises an interconnecting network microstructure. A ceramic bond can be generally referred to as a chemical bonding either between a metal and a non-metal or a non-metal and a non-metal with either covalent, ionic, or a mixed ionic-covalent bonding. The chemical bonding in the preferred embodiment is substantially based on deposition of matter in the adjacent porous structure and not based on Van der Waals or hydrogen bonding. An interconnecting network microstructure can be generally referred to as a microstructure that has some porosity and/or channels that are connected with each other and are accessible from the surface.

DETAILED DESCRIPTION OF THE INVENTION

Figure 1:
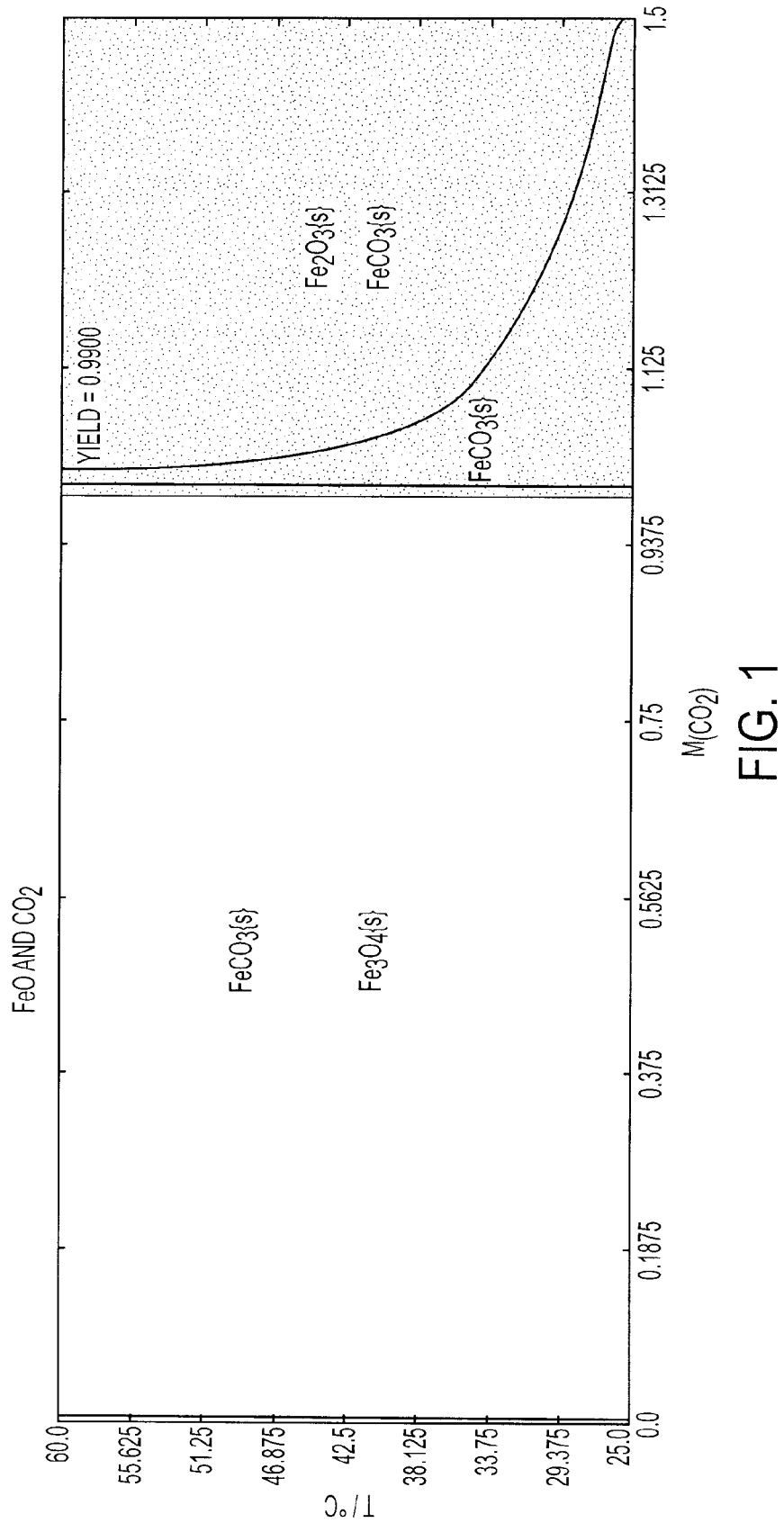
FIG. 1 provides a FeO phase diagram based on thermodynamic computation generated for selection of the reactant species used in the HLPS reaction in one embodiment.

All references cited herein are incorporated by reference in their entirety.

General Conditions for Hydrothermal Liquid Phase Sintering

In a preferred embodiment of hydrothermal liquid phase sintering (HLPS), a "green" or partially sintered, porous, solid matrix having contiguous interstitial pores can be transformed into a sintered ceramic by the action of a liquid phase infiltrating medium. HLPS can be carried out under relatively mild conditions, frequently not exceeding the temperature and pressure encountered in a functioning autoclave. HLPS can be performed in a wide range of temperatures and pressures. For example, in some embodiments, the HLPS conditions can include temperature less than about 2000° C., such as less than about 1000° C., such as less than about 500° C., such as less than about 200° C., such as less than about 100° C., such as less than about 50° C., such as room temperature. The reaction pressure can be less than about 100000 psi, such as less than 70000 psi, such as less than about 50000 psi, such as less than about 10000 psi, such as less than about 5000 psi, such as less than about 1000 psi, such as less than about 500 psi, such as less than about 100 psi, such as less than about 50 psi, such as less than about 10 psi. In one embodiment, the hydrothermal sintering process can be carried out at a temperature in the range of about 80° C. to about 180° C. and a pressure in the range of about 1 to about 3 atmospheres (1 atmosphere is about 15 psi).

In theory, any starting material that is capable of undergoing a hydrothermal reaction with an infiltrating species to produce a different substance may be used to produce the hydrothermally sintered product. Hence, a wide variety of starting materials may be selected, depending on the contemplated end use, formed into a porous solid matrix having the desired shape and size and, subsequently, subjected to the steps of the instant method for transformation into the sintered finished product.

In one embodiment, the porous solid matrix is derived from a metal oxide powder. The powder may be amorphous or crystalline, preferably crystalline. Moreover, the metal oxide powder may have a wide range of particulate sizes ranging from a mean particle size of about 0.01 micron to about 100 microns, including for example about 0.02 to about 50 microns, such as about 0.04 to about 20 microns, such as about 0.08 to about 10 microns. In one embodiment, the powder has a mean particle size ranging from about 0.1 micron to about 5 microns.

The metal in the metal oxide can be chosen from an oxide of a Group IIa metal, Group IIb metal, Group IIIb metal, Group IVb metal, Group Vb metal, transition metal, lanthanide metal, actinide metal or mixtures thereof. Preferably, the chosen metal oxide or the sintered finished product can have potential chemical, ceramic, magnetic, electronic, superconducting, mechanical, structural or even biological applications. The sintered finished product can have industrial or household utility. The finished product need not necessarily comprise the same material as the reactants. For example, a product substantially free of barium titanate, $BaTiO_3$, may be produced by reactants that comprise barium and/or titanium. However, in a different embodiment, the barium and/or titanium comprising reactant (or reactants) can act mostly as an intermediate reaction species, and thus may not necessarily be included in the final product.

"Hydrothermal reaction" described herein can include transformations taking place in aqueous or nonaqueous liquid media. Furthermore, such transformations may include the dissolution and re-precipitation of the same chemical species, the dissolution of one chemical species and its combination with a second chemical species to form a composite material in which the initial chemical species remain distinct, or the reaction of one chemical species with a second chemical species to produce a new chemical moiety that is distinct from the starting species. The hydrothermal sintering process thus can fill the interstitial spaces or voids in a porous solid matrix with a moiety by precipitation (or re-precipitation), ion addition, ion substitution, or a combination thereof. The moiety can comprise the same chemical species as that in the solid matrix, a composite resulting from the co-re-precipitation of two distinct chemical species, a new product resulting from a reaction between two chemical species, a re-precipitated material derived from an infiltrant species contained in the medium, or a combination thereof.

In one embodiment, a HLPS process can be carried out under conditions in which at least a portion of the mass of the green porous solid matrix reacts with preselected infiltrant species present in the fluid medium to produce a new product.

HLPS Reaction

The hydrothermal reaction process can occur via a dissolution-re-precipitation reaction mechanism. Alternatively, the reaction can occur via an ion-substitution reaction. In the former, small portions of the compacted porous solid matrix can dissolve furnishing dissolved species which can react with the ions in the infiltrant solution; the ions in the infiltrant solution can be metal ions. In one embodiment, the amount of the infiltrant added can be enough to produce the complete reaction in a single step. Alternatively, multiple steps can be involved. For example, multiple infiltration can be involved. In one embodiment, strontium titanate can be formed from a titania matrix, thereafter by another infiltration it can form strontium apatite. Alternatively, via multiple infiltrations, a carbonate can be formed, which can then form a protective oxalate layer. In another embodiment, the compact can be partially infiltrated and dried, and the infiltration step can be repeated until the final product is produced.

The shape of the product can be retained from that of the solid matrix. In one embodiment, when the molar volume of the product is greater than that of the oxide powder (i.e., a positive molar volume change-i.e., transformation to a larger molar volume), the nucleated product fills the voids of the compact and increases its density. The molar volume change need not be positive; it can also be negative (i.e., transformation to a smaller molar volume) or no change depending on the ion species and reaction mechanism. For example, a portion of the matrix can dissolve away during the reaction, increasing porosity while creating new chemical bonding and a negative molar volume change. Similarly, if the new material form has the same volume as that from the loss of the matrix, then there is substantially no molar volume change.

HLPS reaction can occur via, for example, ion addition and/or ion substitution. Addition reactions are where ions (anions or cations) in the infiltrating medium can be added to the matrix host without substituting another ion in the matrix. Examples of an ion addition can include transformation from oxide to hydroxide, or from oxide to carbonate. Examples of an ion substitution can include transformation from hydroxide to carbonate, or hydroxide to oxalate. Additionally, the reaction can occur via disproportionation, wherein the insoluble inorganic host/matrix material can be split into two insoluble inorganic products. Disproportionation can be performed, for example, for oxides, fluorides, hydroxides, sulfates, mixed metal oxides, silicates, hydroxyapatites.

Heterogeneous nucleation can also take place during the reaction. As described previously, the change in density can depend on the type of the matrix material and/or that of the product formed. Once the hydrothermal reaction is complete, the open pores can be further removed by, for example, aging.

After the reactions as described above are completed, the densified monolithic matrix may be rinsed or bathed in a solution to wash away excess infiltrating solution. The rinsing solution can be pH 5 ammonium acetate. In one embodiment, the densified matrix may be subsequently dried in an oven at a temperature of about 90° C. to 250° C. The residual porosity that may be present in the sintered ceramic can be further removed by heating to a higher temperature, such as about 600° C. or less.

The ceramic product sintered by the HLPS process can have a variety of applications. For example, it can be used a structural, chemical (e.g., catalyst, filtration), electronic components, semiconductor material, electrical material, or combinations thereof.

Preparation of the Porous Solid Matrix

The solid matrix can comprise a material that does not dissolve in a solution readily. In one embodiment, the porous solid matrix is derived from powder. The powder can be of any kind. For example, it can be a metal oxide powder. Examples of suitable metal oxide powders can include, the oxides of berylium (e.g., BeO), magnesium (e.g., MgO), calcium (e.g., CaO, $CaO_2$), strontium (e.g., SrO), barium (e.g., BaO), scandium (e.g., $Sc_2O_3$), titanium (e.g., TiO, $TiO_2$, $Ti_2O_3$), aluminum (e.g., $Al_2O_3$), vanadium (e.g., VO, $V_2O_3$, $VO_2$, $V_2O_5$), chromium (e.g., CrO, $Cr_2O_3$, $CrO_3$, $CrO_2$), manganese (e.g., MnO, $Mn_2O_3$, $MnO_2$, $Mn_2O_7$), iron (e.g., FeO, $Fe_2O_3$), cobalt (e.g., CoO, $Co_2O_3$, $Co_3O_4$), nickel (e.g., NiO, $Ni_2O_3$), copper (e.g., CuO, $Cu_2O$), zinc (e.g., ZnO), galluim (e.g., $Ga_2O_3$, $Ga_2O$), germanium (e.g., GeO, $GeO_2$), tin (e.g., SnO, $SnO_2$), antimony (e.g., $Sb_2O_3$, $Sb_2O_5$), indium (e.g., $In_2O_3$), cadium (e.g., CdO), silver (e.g., $Ag_2O$), bismuth (e.g., $Bi_2O_3$, $Bi_2O_5$, $Bi_2O_4$, $Bi_2O_3$, BiO), gold (e.g., $Au_2O_3$, $Au_2O$), zinc (e.g., ZnO), lead (e.g., PbO, $PbO_2$, $Pb_3O_4$, $Pb_2O_3$, $Pb_2O$), rhodium (e.g., $RhO_2$, $Rh_2O_3$), yttrium (e.g., $Y_2O_3$), ruthenium (e.g., $RuO_2$, $RuO_4$), technetium (e.g., $Ti_2O$, $Ti_2O_3$), molybdenum (e.g., $MoO_2$, $MO_2O_5$, $Mo_2O_3$, $MoO_3$), neodymium (e.g., $Nd_2O_3$), zirconium (e.g., $ZrO_2$), lanthanum (e.g., $La_2O_3$), hafnium (e.g., $HfO_2$), tantalum (e.g., $TaO_2$, $Ta_2O_5$), tungsten (e.g., $WO_2$, $W_2O_5$), rhenium (e.g., $ReO_2$, $Re_2O_3$), osmium (e.g., OsO, $OsO_2$), iridium (e.g., $IrO_2$, $IR_2O_3$), platinum (e.g., PtO, $PtO_2$, $PtO_3$, $Pt_2O_3$, $Pt_3O_4$), mercury (e.g., HgO, $Hg_2O$), thallium (e.g., $TlO_2$, $TlO_2O_3$), palladium (e.g., PdO, $PdO_2$) the lathanide series oxides, the actinide series and the like. Moreover, depending upon the particular application involved, mixtures of metal oxides may also be used in making the preform.

The matrix can also comprise a hydroxide, such as a metal hydroxide. For example, it can comprise magnesium hydroxide (e.g., $Mg(OH)_2$), calcium hydroxide (e.g., $Ca(OH)_2$), strontium hydroxide (e.g., $Sr(OH)_2$), and barium hydroxide (e.g., $Ba(OH)_2$), chromium hydroxide (e.g., $Cr(OH)_2$), titanium hydroxide (e.g., $Ti(OH)_2$), zirconium hydroxide (e.g., $Zr(OH)_4$), manganese hydroxide (e.g., $Mn(OH)_2$), iron hydroxide (e.g., $Fe(OH)_2$), copper hydroxide (e.g., $Cu(OH)_2$), zinc hydroxide (e.g., $Zn(OH)_2$), aluminum hydroxide (e.g., $Al(OH)_3$), or a combination thereof.

The matrix can also comprise a fluoride, such as a metal fluoride. For example, it can comprise magnesium fluoride (e.g., $MgF_2$), calcium fluoride(e.g., $CaF_2$), strontium fluoride (e.g., $SrF_2$), and barium fluoride (e.g., $BaF_2$), chromium fluoride(e.g., $CrF_2$), titanium fluoride(e.g., $TiF_3$), zirconium fluoride(e.g., $ZrF_4$), manganese fluoride(e.g., $MnF_2$), iron fluoride(e.g., $FeF_2$), copper fluoride(e.g., $CuF_2$), nickel fluoride(e.g., $NiF_2$), zinc fluoride(e.g., $ZnF_2$), aluminum fluoride (e.g., $AlF_3$), or combinations thereof.

The matrix can also comprise a mixed metal oxide, such as a metal titanate. For example, it can comprise magnesium titanate (e.g., $MgTiO_3$), calcium titanate (e.g., $CaTiO_3$,), strontium titanate (e.g., $SrTiO_3$), barium titanate (e.g., $BaTiO_3$), or a combinations thereof.

The matrix can also comprise a sulfate, such as a metal sulfate. For example, it can comprise magnesium sulfate (e.g., $MgSO_4$), calcium sulfate (e.g., $CaSO_4$), strontium sulfate (e.g., $SrSO_4$), and barium sulfate (e.g., $BaSO_4$), chromium sulfate (e.g., $Cr_2(SO_4)_3$), titanium sulfate (e.g., $TiSO_4$, $Ti_2(SO_4)_3$), zirconium sulfate(e.g., $ZrSO_4$), manganese sulfate (e.g., $MnSO_4$), iron sulfate (e.g., $FeSO_4$), copper sulfate (e.g., $CuSO_4$), nickel sulfate (e.g., $NiSO_4$), zinc sulfate (e.g., $ZnSO_4$), aluminum sulfate (e.g., $Al_2(SO_4)_3$), or combinations thereof.

The matrix can also comprise a silicate, such as a metal silicate. For example, it can comprise lithium metasilicate, lithium orthosilicate, sodium metasilicate, beryllium silicate, calcium silicate, strontium orthosilicate, barium metasilicate, zirconium silicate, manganese metasilicate, iron silicate, cobalt orthsilicate, zinc orthosilicate, cadmium metasilicate, andalusite, silimanite, hyanite, kaolinite, or combinations thereof.

The matrix can also comprise a hydroxyapatite, such as a metal hydroxyapatite. For example, it can comprise calcium carbonate, calcium nitrate tetrahydrate, calcium hydroxide, or combinations thereof.

The matrix can further comprise an inert fill material, in addition to any of the materials mentioned above and others. An inert fill material can be any material that is incorporated into the solid matrix to fill the pores and do not significantly react with the infiltrant to for chemical bonding. For example, the inert material can be wood, plastic, glass, metal, ceramic, ash, or combinations thereof.

The powder can be characterized by a mean particle size, which can range from about 0.005 μm to 500 μm, such as from about 0.01 μm to about 100 μm, particle size distribution and specific surface area. A fine mean particle size and a narrow particle size distribution can be desirable for enhanced dissolution.

The powder can be formed into a green body of any desired shape and size via any conventional technique, including extrusion, injection molding, die pressing, isostatic pressing, and slip casting. Ceramic thin films can also be formed. Any lubricants, binders of similar materials used in shaping the compact can be used and should have no deleterious effect on the resulting materials. Such materials are preferably of the type which evaporate or burn out on heating at relatively low temperature, preferably below 500° C., leaving no significant residue.

The matrix can comprise, for example, a mineral, an industrial waste, or an industrial chemical material. A mineral can be, for example, a mineral silicate, or a gypsum. An industrial waste can be, for example, fly ash, slag, or battery waste. An industrial chemical can be any chemical synthesized or prepared by a factory or an industry in general.

The compact can be formed into the predetermined shape and dimensions of the product material. The compact can be in any form. The volume of open porosity of the compact (0-80%) can depend on the ratio of molar volume of the reaction product to the molar volume of the powder. The product material can be for example a monolithic body, such as a monolithic dense body. In one embodiment, the reaction product formed within the pores of the compact can have a greater molar volume than the powder. The reaction product can have a greater molar volume than the oxide powder to fill the voids of the compact during the reaction. For example, if the molar volume of the reaction product is twice as great as that of the oxide powder, the compact should have an open porosity of about 50% by volume.

The pores in the starting powder compact can be small, for example, between about 0.01 micrometers (μm) and about 100 μm, such as between about 0.1 μm and about 1 μm, and uniformly distributed throughout the compact, thereby enabling the infiltrant solution to penetrate fully the powder compact. The pore volume content, both close and open porosity, and the pore size can be determined by standard methods. For example, a mercury intrusion pore sizer can be used to evaluate these three parameters.

The preform obtained above can then be subjected to the steps as discussed below.

Preparation of the Infiltrating Medium

As described previously, hydrothermal sintering can make use of aqueous or nonaqueous media. The choice of liquid solvent can depend on the infiltrant species that may be a part of the infiltrating medium. The infiltrant species can have a substantial solubility in the liquid solvent under the conditions of the hydrothermal sintering process. For example, if the infiltrant species are ionic, then a liquid solvent can be water. Certain nonionic infiltrants may also possess sufficient solubility in aqueous media.

In addition, water-soluble organic solvents, such as alcohols (e.g., methanol, ethanol, propanol, isopropanol and the like), polyols (e.g., ethandiol, 1,2-propanediol, 1,3-propanediol and the like), certain low molecular weight ethers (e.g., furan, tetrahydrofuran), amines (e.g., methylamine, ethylamine, pyridine and the like), low molecular weight ketones (e.g., acetone), sulfoxides (e.g., dimethylsulfoxide), acetonitrile and the like, may also be present in the aqueous mixture. In certain instances, surfactants (e.g., polysiloxanes, polyethylene glycols, and alkyldimethylamine oxides and the like) may be added to the aqueous mixture.

The infiltrating medium preferably contains water-soluble metal salts (i.e., metal in ion forms). The cation of such salts, for example, may come from the following metals: berylium, magnesium, calcium, strontium, barium, scandium, titanium, vanadium, chromium, manganese, iron, cobalt, nickel, copper zinc, aluminum, gallium, germanium, tin, antimony, indum, cadium, silver, lead, rhodium, ruthenium, technetium, molybdenum, neodymium, zironium, ytterbium, lanthanum hafnium, tantalum, tungsten, rhenium, osmium, iridium, platinum, gold, mercury, thallium, palladium, cations of the lanthanid series metals, cations of the actinide series metals, and or a mixture thereof. In general, the anion of the salts dissolved in the infiltrating solution may come, for example, from the following groups: hydroxides, nitrates, chlorides, acetates, formates, propionates, phenylacetates, benzoates, hydroxybenzoates, aminobenzoates, methoxybenzoates, nitrobenzoates, sulfates, fluorides, bromides, iodides, carbonates, oxalate, phosphate, citrate, and silicates, or mixtures thereof. The molar ratio of the metal ions contained in the infiltrant to the metal ion of the oxide powder can be selected to achieve a desired stoichiometric reaction product. Excess metal ions in solution may be needed to help achieve completion of the reaction.

Depending on the infiltrating medium and the matrix material, the resultant sintered product can be, for example, a titanate, if a material comprising titanium is involved. For example, titanates having a ilmenite structure can be obtained from $TiO_2$ and salts of $Fe^{2+}$, $Mg^{2+}$, $Mn^{2+}$, $Co^{2+}$, $Ni^{2+}$, or a combination thereof, in water. Titanates having the perovskite structure can be prepared from aqueous salt solutions of $Ca^{2+}$, $Sr^{2+}$, barium ions, or a combination thereof. Moreover, compounds having a spinel structure can be obtained including, $Mg_2TiO_4$, $Zn_2TiO_4$, and $Co_2TiO_4$. Furthermore, different phases of barium titanate, such as that having the formula $Ba_xTi_yO_{x+2y}$, in which x and y are integers, can be obtained by the method of the present invention.

Alternatively, the resultant sintered product can be a carbonate, sulfate, oxalate, or a combination thereof; materials that can be used can include a material that may decompose before it is able to sinter if a conventional sintering method is used; for example a carbonate will decompose into its oxide when heated before it is able to sinter in a conventional sintering method. The carbonate, sulfate, oxalate, can be, for example, metal carbonate, meta sulfate, meta oxalate, respectively, comprising a cation of an element found on the periodic table.

Characterization of the Sintered Material

Porosity of Sintered Material

HLPS can produce a sintered product with a very homogeneous and very fine microstructure. The porosity of the sintered material can be, for example, less than about 15 percent, such as less than about 10 percent, such as than about 5 percent, or even practically fully dense. The total porosity of the compact can be determined in a standard technique, for example, with a mercury pore sizer. Density can be estimated using a conventional technique such as Archimede's mercury pore sizer Size and Shape of Sintered Material One characteristic of the sintered material undergoing the HLPS process is that it can have the same shape, or even size, as the starting green compact. In one embodiment wherein the product undergoes substantially no molar volume change, no shrinkage of the compact can result, which is in contrast to many ceramic manufacturing processes, and thus little or no machining of the sintered material is needed.

Composition of Sintered Material

As illustrated in the Examples, a broad range of chemical compositions can be used to make the sintered material. Furthermore, the number of different metal oxides and salts involved in the formation of the sintered material need not be restricted in any particular way. In addition, the stoichiometry of the final product can be dictated by the molar ratios of reactants present in the green compact and infiltrating medium. The composition of the sintered material can be evaluated using Quantitative X Ray Diffraction (QXRD) and Inductively Coupled Plasma (ICP).

Microstructure and Related Mechanical Properties

The sintered product of the HLPS process can have a microstructure that substantially resembles a net-like interconnecting network. The monoliths obtained from the HLPS process can also exhibit composite structures such as a core-shell structure. In addition, the product can have superior mechanical properties, such as high tensile strength, compressive strength, and desirable tensile modulus. This strengthening can arise from the chemical bonding formed during the process between the physically bonded particles by ion substitution, ion addition, Ostwald ripening (i.e., recrystallization that can form new network), or combinations thereof. In one embodiment, Ostwald ripening can involve aging a carbonate material in an alkaline medium. Furthermore, in the case where there is a positive molar volume change, densification can be achieved, as described previously.

Cement-Making by HLPS

Conventionally, cements are made in two steps: (i) they are synthesized with high temperature processes and (ii) then are consolidated and bound with water to make a monolithic structure.

HLPS can integrate the synthesis and consolidate/bonding steps of cement making, providing a compact, energy efficient, and environmentally friendly process. It can be versatile, using a wide range of raw materials, which will allow processes to be used for ingredients that can be conveniently accessible (e.g., waste from a factory), thereby minimizing transportation costs.

Instead of making ceramics using high temperature processes, HLPS can provide an alternative to form a variety of ceramic materials of interest in a fluid in mild temperature and/or pressure conditions. The ceramic crystals can be made without using "corrective" milling processes as in a convention procedure and have crystal sizes and morphology with suitable reactivity for making materials. Furthermore, the chemical bond of the product produced by HLPS can be ceramic bonds, or can be substantially free of hydraulic bonds, as generally produced by a convention construction material (i.e., cement) making process. Conventional cements have hydraulic bonding, and as a result, can degrade with respect of its mechanical strength starting at about 200° C.—it can lose almost all of its strength at 1000° C. By substantially minimizing formation of hydraulic bonding (that is, bonding involving water molecules or portions thereof), the ceramic produced by HLPS can withstand temperatures at least about 1000° C.

Other benefits of using HLPS to produce cement, or ceramic in general, can include shorter reaction time to form a ceramic product. Hydrothermal reactions can be based on aqueous solution reactions where ceramics can be directly formed from a solution at temperatures typically less than about 400° C., such as less than 300° C., or at about room temperature.

The ceramic produced can also be highly dense with substantially no hydraulic bonds and mostly ceramic bonds. For examples, the bonds in cements can be created by hydration of the powders slurried in water. Conventional ceramics have most of their bonds created by diffusion induced by high temperature firing. By contrast, the ceramics of HLPS can be formed by reacting a monolithic compact of powder or solid matrix with a infiltrating medium to fill the interstitial spaces (i.e., pores) of the particles. The crystals nucleating and growing in these interstitial spaces can form chemical bonding to one another and to the powder matrix to create a ceramic-bonded monolithic body. As a result, unlike a hydraulic cementation process, anhydrous ceramic bonds can be formed, whose stability can be at least about 1000° C., such as about 2000° C. Furthermore, unlike a conventional densification process (e.g., solid state sintering), the reaction temperature can be lower than about 90° C., such as room temperature.

As described previously, a product of HLPS process can undergo a change in molar volume (increase or decrease) or substantially no change. In one embodiment, wherein the molar volume change is positive, densification can also occur. In one embodiment, wherein the solid matrix can ask as a scaffold for a bonded structure to form, substantially no change in dimensions has occurred. As a result, substantially no defects such as cracks or defects were induced. While the material does not change dimension, the relative porosity of the structure can be controlled by the choice of the reactive chemistry where the percentage molar volume change between the product and reactant can determine the porosity remaining in the structure. For example, a 50% porous structure that is reacted to form a product that has a 100% molar volume change can fully densify. In one embodiment, having a large pore size can be desirable to achieve complete conversion. Note that the initial density can be controlled by both choice of the matrix powder and the forming technique for packing the powders.

There are many reactions where a volume increase or decrease can be engineered to result (see Table 1) to change the porosity while bonding the ceramic with the crystals that form from the reaction. For example, converting a matrix of $CaSO_4$ to $CaC_2O_4 \cdot H_2O$ can result in a molar volume increase (densification) of 44.4 vol %, while converting $CaSO_4$ to $CaCO_3$ can result in a molar volume decrease (increased porosity) of −19.7 vol %. Control of this process can be further controlled by mixing components of negative and positive volume change to engineer a composite whose net density (pore fraction) change can be engineered to a either a , zero, positive or negative value. As shown in Table 1, a molar volume increase of as large as 616 vol % and a molar volume decrease of 50.2 vol % can be possible.

The ability to decrease or increase porosity can have a great utility. For example, large molar volume increases can have utility in low density matrices that can accommodate the large expansion, such as aggregate that can go into road building material or building structures. On the other hand, large volume decreases can be used to improve transport of reacting solutions that bond aggregate as the reactions proceed by increasing the permeability as the reaction proceeds. In addition, composites can include the addition of inert powders to reduce a density increase (or decrease), which can proportionately diminish the molar volume increase (or decrease). In general, whether the reaction results in a volume expansion or contraction of the matrix, crystals forming from the reaction can serve to bond the matrix, be it a reactant, inert component, or a product that has already formed from the reaction.

TABLE 1

Density, molecular weight, molar volume, % vol change to its carbonate, % vol change to its oxalate of starting materials for HLPS.

| Starting Material | Molar Volume (cc/mol) | % molar volume change to its carbonate | % molar volume change to its oxalate |
|---|---|---|---|
| CaSO$_4$ | 45.99 | −19.7 | 44.4 |
| CaSO$_4$·2H$_2$O | 74.21 | −50.23 | −10.51 |
| FeO | 11.97 | 148.09 | 558.94 |
| Fe$_2$O$_3$ | 15.21 | 95.33 | 418.8 |
| Fe$_3$O$_4$ | 14.93 | 99 | 428.54 |
| MgO | 11.2 | 146.92 | 616.28 |
| Mg(OH)$_2$ | 24.61 | 12.34 | 225.88 |
| MgCO$_3$ | 27.64 | 0 | 190.09 |
| Ca(OH)$_2$ | 33.68 | 9.66 | 97.2 |
| FeTiO$_3$ | 32.14 | −7.58 | 145.48 |
| FeCO$_3$ | 29.71 | 0 | 165.6 |
| CaCO$_3$ (calcite) | 36.93 | 0 | 79.83 |

HLPS can provide a method to form ceramic bonds with a variety of materials, including those that cannot be prepared by any convention process. Accordingly, ceramic such as marble, a naturally occurring calcium carbonate (CaCO$_3$) can be synthesized from non-carbonated calcium sources.

Because of the versatility of the HLPS process, the process can be used to capture greenhouse gases, such as carbon dioxide, while forming a dense ceramic, as described previously. The process can be further integrated into power-generating facilities that emit greenhouse gases, wherein the gases can be captured and fed directly into the HLPS process as a reactant.

Forming Ceramics by Gas Capture

With the HLPS process, gases can be captured from the atmosphere and used in the reaction to form a variety of ceramics, including marble or cements. The gases can be any type of gas, such as a greenhouse gas, including carbon dioxide, or a gas containing, in general, carbon, sulfur, phosphor, nitrogen, hydrogen, oxygen, or a combination thereof.

Figure 2:
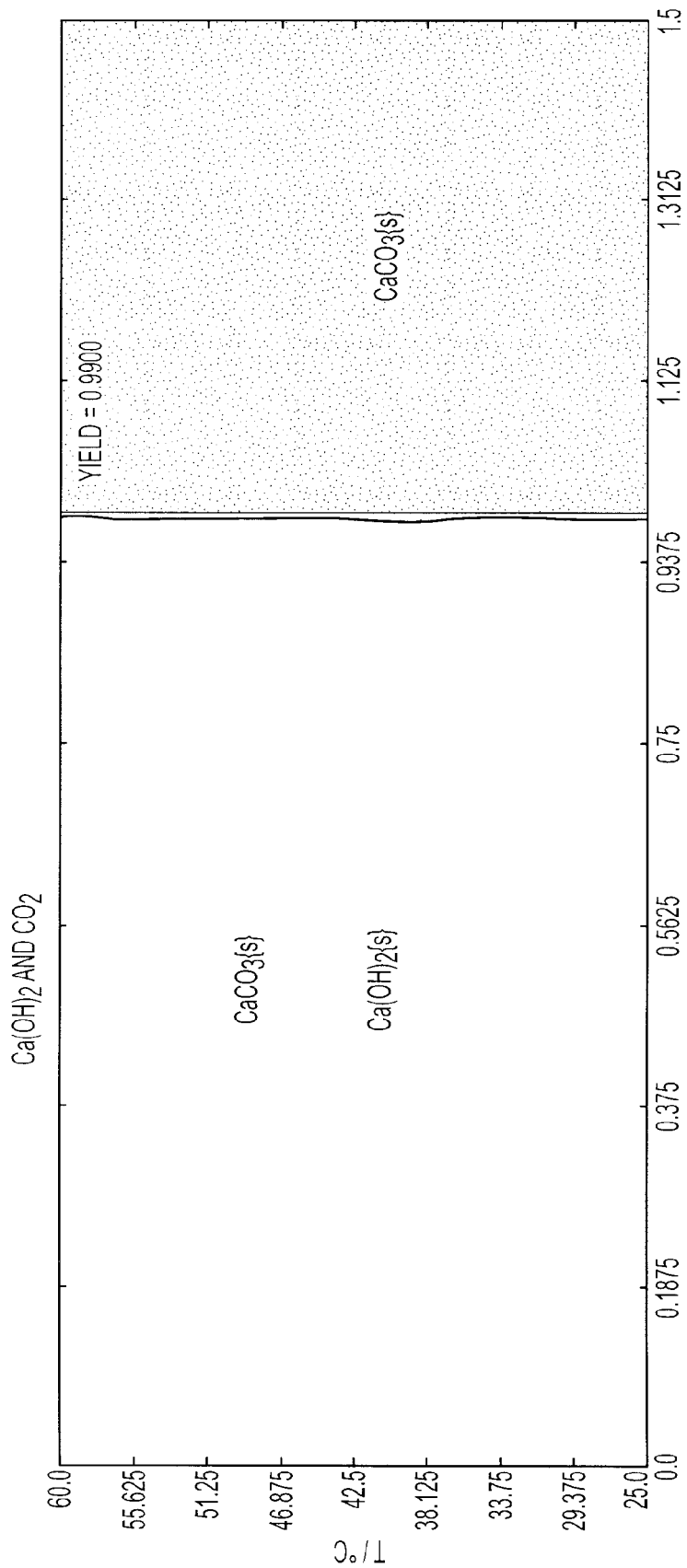
FIG. 2 provides a $Ca(OH)_2$ phase diagram based on thermodynamic computation generated for selection of the reactant species used in the HLPS reaction in one embodiment.
Figure 3:
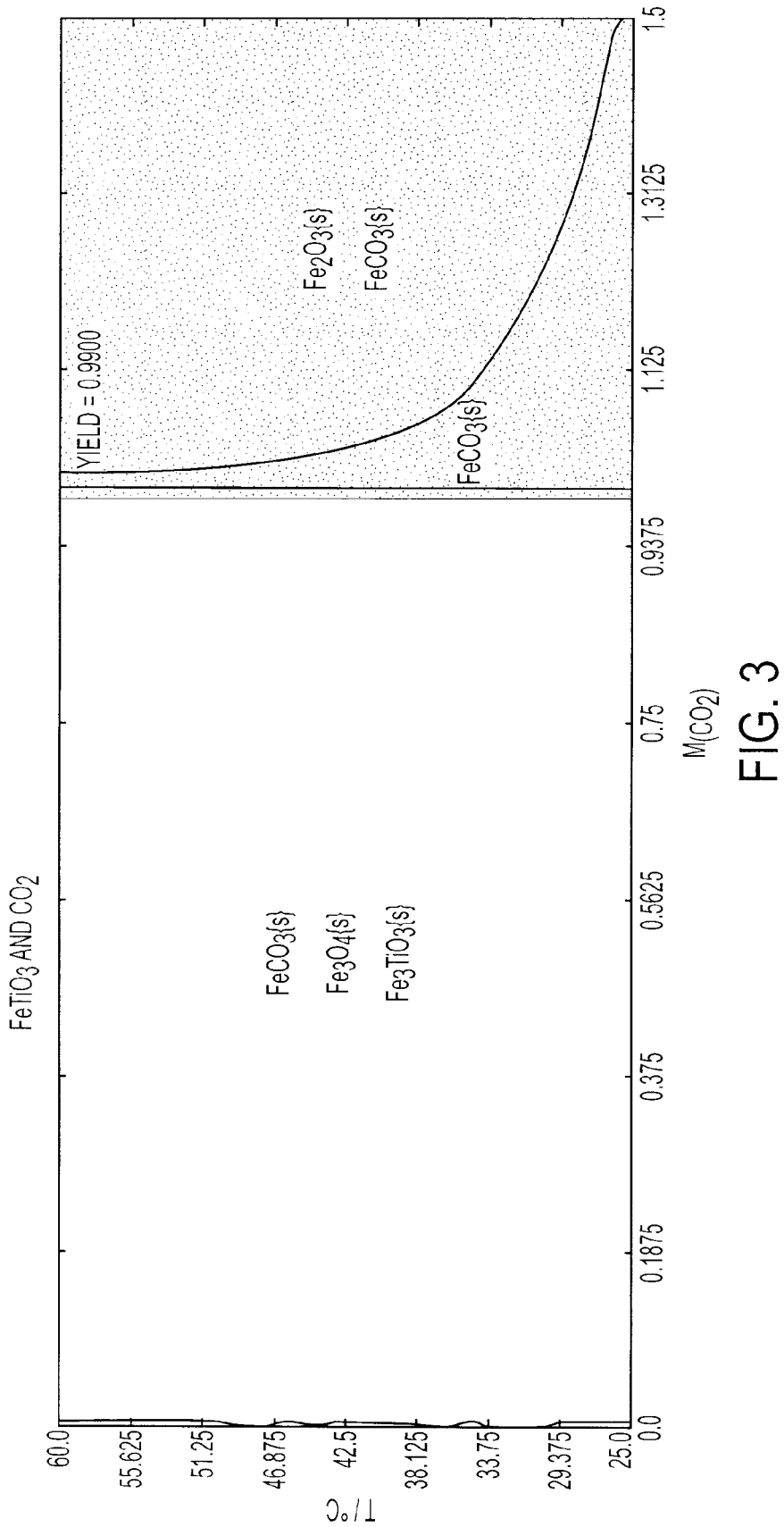
FIG. 3 provides a $FeTiO_3$ phase diagram based on thermodynamic computation generated for selection of the reactant species used in the HLPS reaction in one embodiment.
Figure 4:
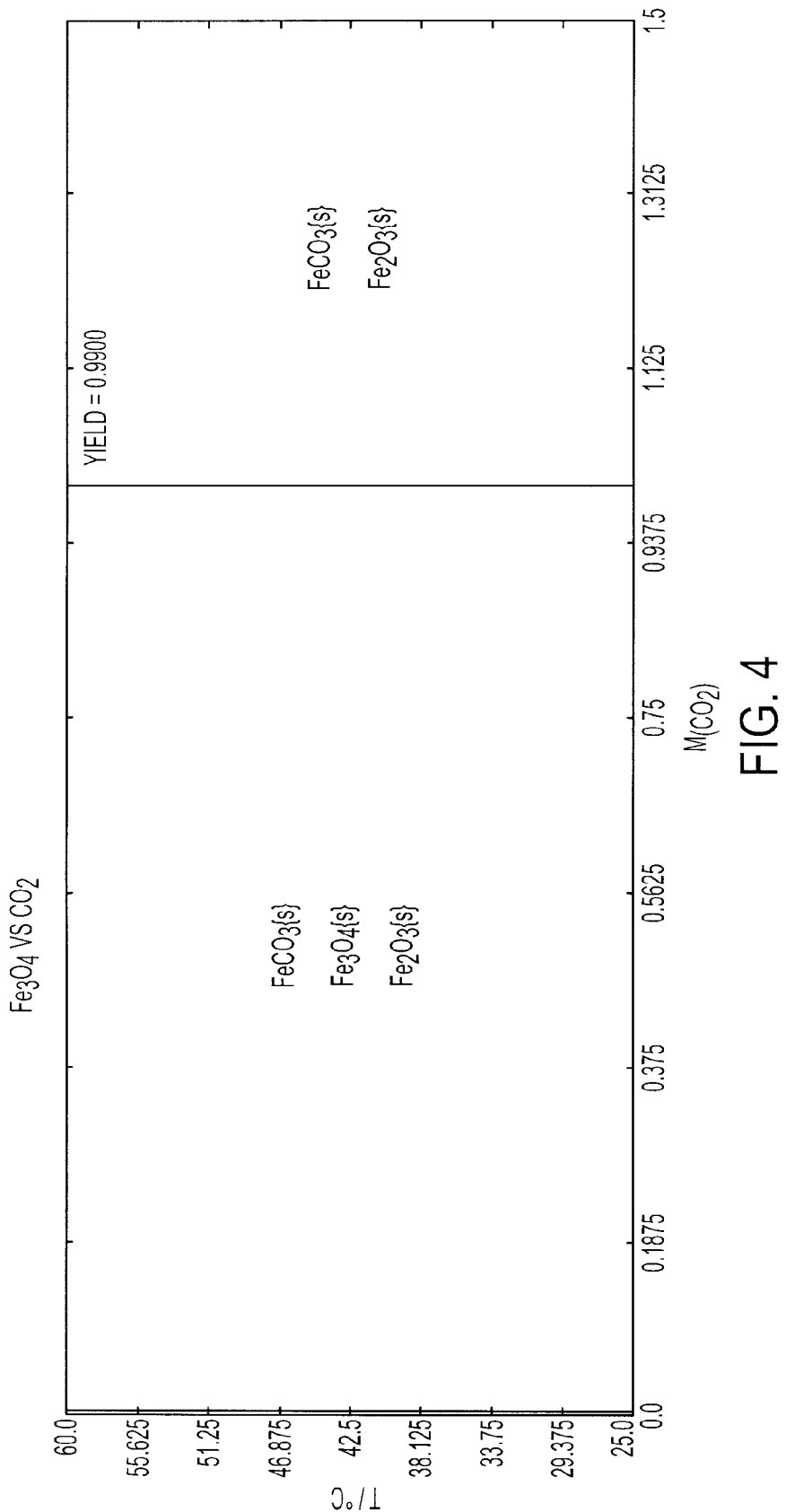
FIG. 4 provides a $Fe_3O_4$ phase diagram based on thermodynamic computation generated for selection of the reactant species used in the HLPS reaction in one embodiment.

Phase diagrams generated by computations based on thermodynamic can be performed to help with selecting an appropriate reactant for the HLPS process. For example, reactions with CaSO$_4$ and CO$_2$ may not form CaCO$_3$, while many other systems were found to react. The following chemical reactions, with a matrix reacting with CO$_2$-saturated solutions are accompanied by the results of its thermodynamic computation, showing suitability for sequestering carbon dioxide with formation of carboxylate compounds. Note that the carbon source and its concentration is a variable and the other ceramic reactant is held at constant concentration. For each precursor system, the phases produced were reported for a range of temperatures, including room temperature.

$$FeO+CO_2 \rightarrow FeCO_3 \quad \text{(FIG. 1)}$$

$$Ca(OH)_2+CO_2 \rightarrow CaCO_3+H_2O \quad \text{(FIG. 2)}$$

$$FeTiO_3+CO_2 \rightarrow FeCO_3+TiO_2 \quad \text{(FIG. 3)}$$

$$Fe_3O_4+CO_2 \rightarrow FeCO_3+Fe_2O_3 \quad \text{(FIG. 4)}$$

Like ilmenite (FeTiO$_3$), perovskite (CaTiO$_3$), sphene (CaTiSiO$_5$) or alkaline earth feldspars (CaAl$_2$Si$_2$O$_8$) can be decomposed into a carbonate and a respective oxide. For reactions such as Fe$_2$O$_4$, with an appropriate reducing environment, it may be possible to reduce the Fe$^{3+}$ species such that all iron species are divalent and available for carbonation. Oxides based on Fe$^{3+}$ are not predicted to form iron carbonates.

Figure 5:
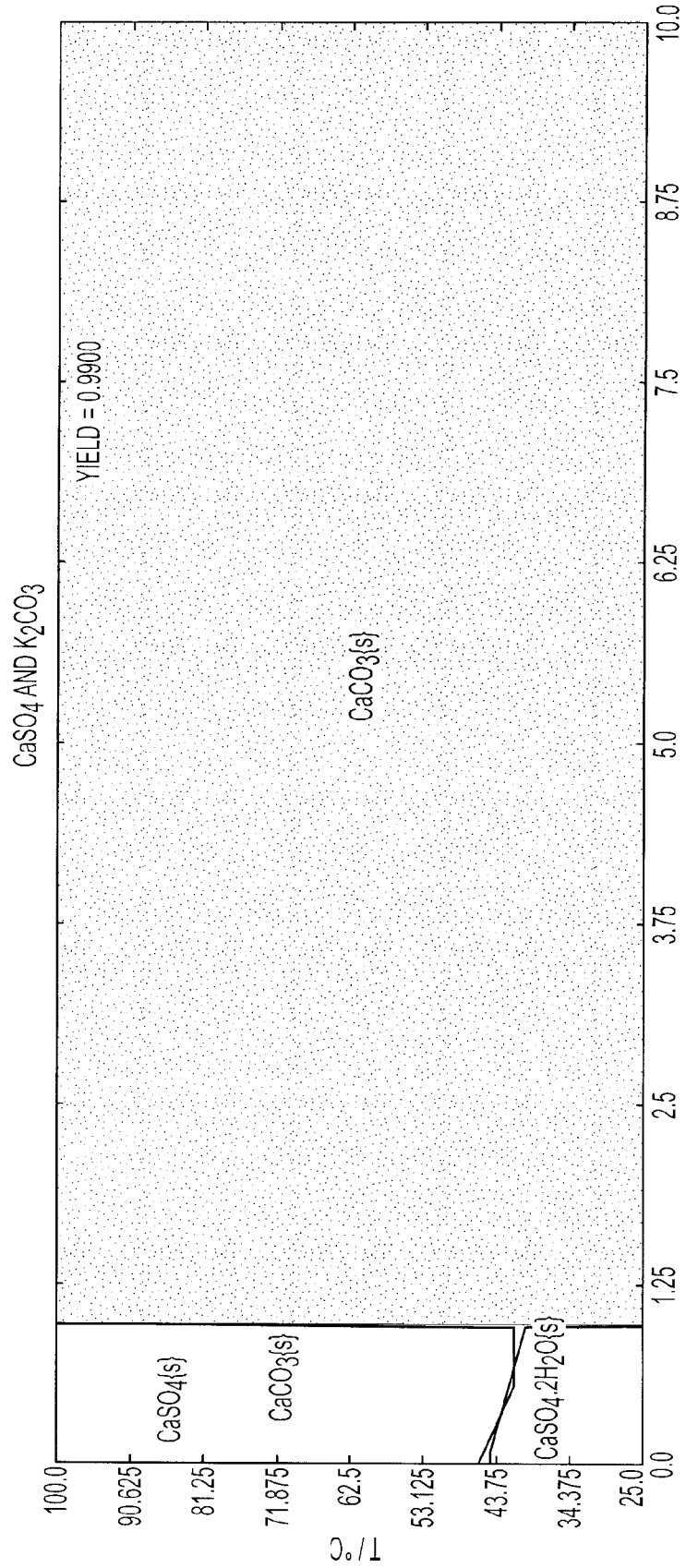
FIG. 5 provides a $Fe_3O_4$ phase diagram based on thermodynamic computation generated for selection of the reactant species used in the HLPS reaction in one embodiment. provides thermodynamic computation results for $CaSO_4$ and $K_2CO_3$.

For certain materials, CO$_2$ may not be reactive according to the computations. For example, CaSO$_4$ does not react with soluble CO$_2$. In other cases, other means of CO$_2$ capture may be more advantageous. For example, potassium can be converted to potassium hydroxide electrochemically, thereby capturing carbon dioxide gas to form K$_2$CO$_3$ and then precipitate CaCO$_3$ from CaSO$_4$ as follows:

$$CaSO_4+K_2CO_3 \rightarrow CaCO_3+K_2SO_4 \quad \text{(FIG. 5)}$$

Figure 6:
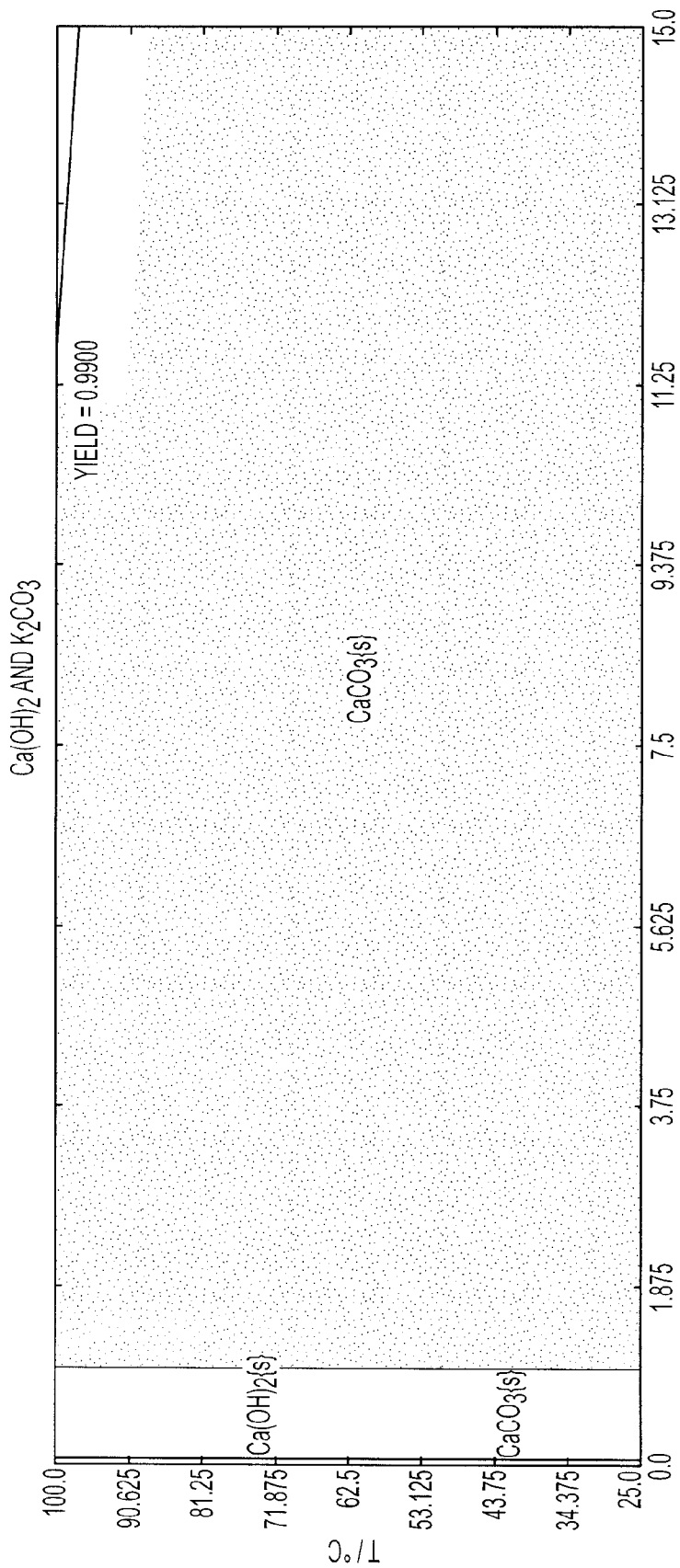
FIG. 6 provides a $Ca(OH)_2$ and $K_2CO_3$ phase diagram based on thermodynamic computation generated for selection of the reactant species used in the HLPS reaction in one embodiment.

Similar reactions can be performed with carbonate salts of sodium or ammonium. In one embodiment, porous marble (i.e., calcium carbonate) can be prepared, and K$_2$SO$_4$ can remain in the structure. Other non-mineral reactants can also be used to capture CO$_2$, such as Ca(OH)$_2$.

$$Ca(OH)_2+K_2CO_3 \rightarrow CaCO_3+2KOH \quad \text{(FIG. 6)}$$

Other suitable alkali carbonates can include Na$_2$CO$_3$ and NH$_4$CO$_3$. In general, alkali carbonates can be derived from alkali hydroxides. Reactions involving hydroxides such as the above reaction can return the alkali hydroxide when carbonation occurs. Thus, such a reaction can allow recycling of the alkali hydroxide to capture more CO$_2$. In one embodiment, mineral oxides can be used to return the alkali hydroxide when a carbonation reaction is used:

$$MO+M'_2CO_3+H_2 \rightarrow MCO_3+2M'OH,$$

where, M=Na$^+$, K$^+$, NH$_4^+$

Iron ore, (Fe$_2$O$_4$/Fe$_3$O$_4$, which is abundant on earth, can be used. Alternatively, Mg can be used in a reactive sintering process that can be initiated with limestone as follows:

$$Mg^{2+}+K_2CO_3+CaCO_3 \rightarrow MgCO_3/CaCO_3+2K^+.$$

A porous limestone body thus can be filled with MgCO$_3$ to make a composite material.

One important advantage of making a structural material such as a carbonate by capturing a greenhouse gas such as carbon dioxide can be that carbon dioxide is consumed during the process, and the process does not produce significant amounts of greenhouse gases.

Gas Sequestration

Figure 7:
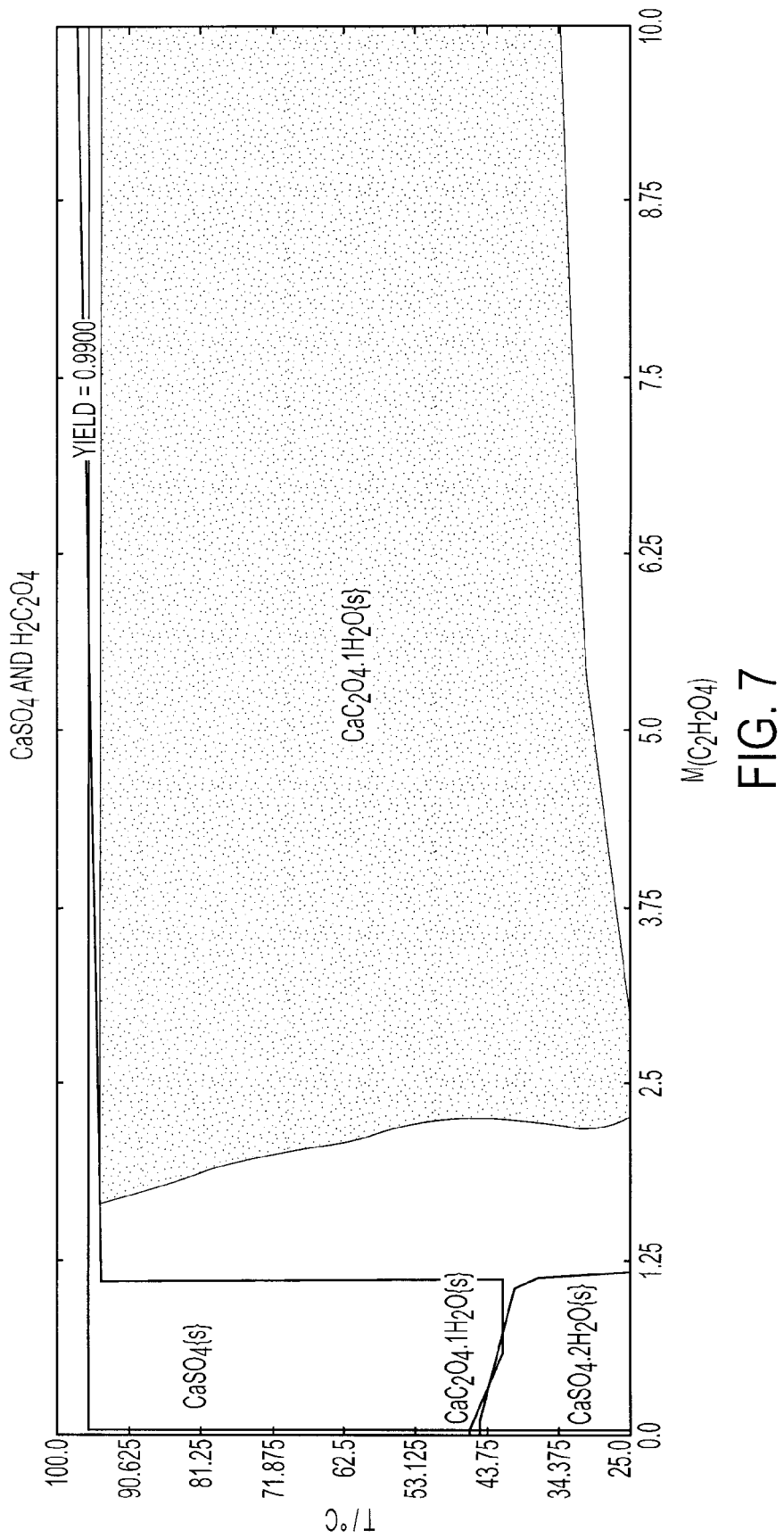
FIG. 7 provides a $CaSO_4$ and $C_2H_2O_4$ phase diagram based on thermodynamic computation generated for selection of the reactant species used in the HLPS reaction in one embodiment.
Figure 8:
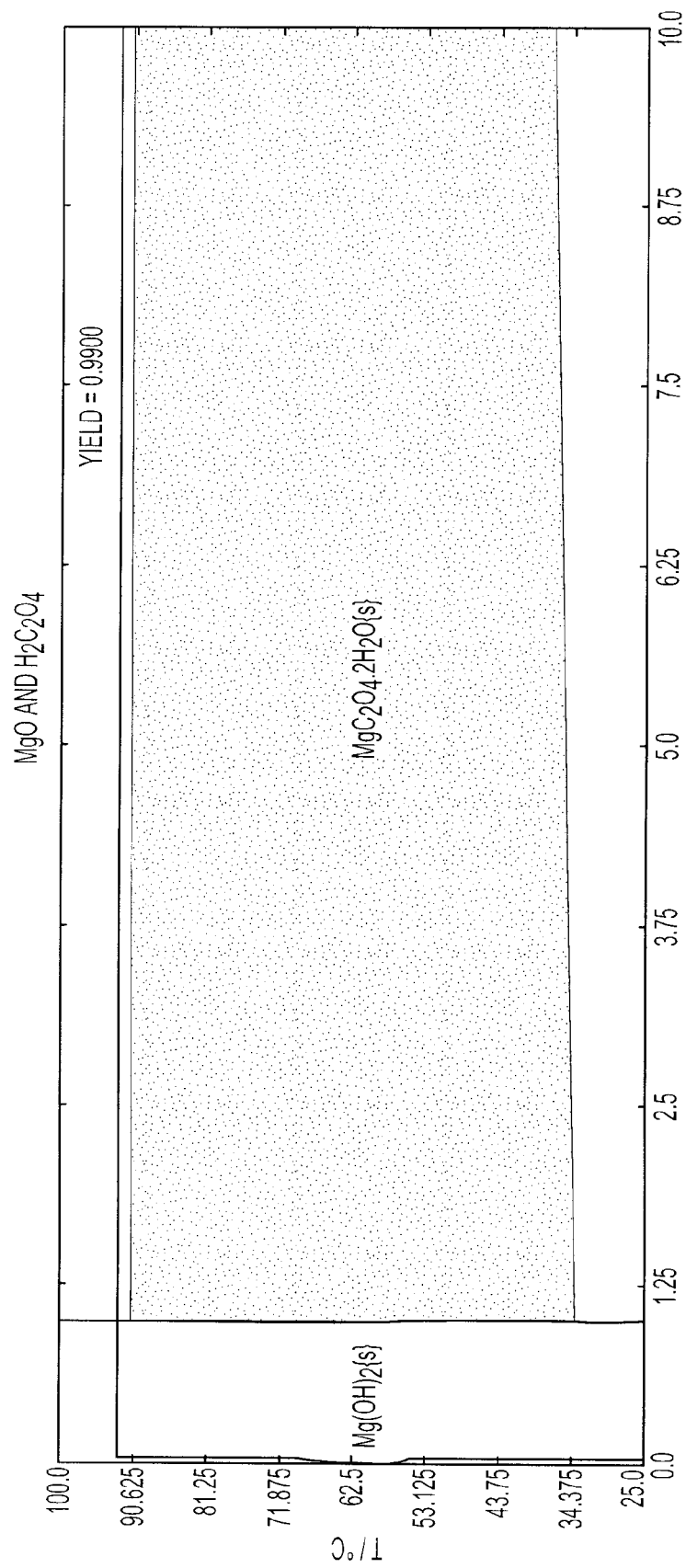
FIG. 8 provides a MgO and $C_2H_2O_4$ phase diagram based on thermodynamic computation generated for selection of the reactant species used in the HLPS reaction in one embodiment.
Figure 9:
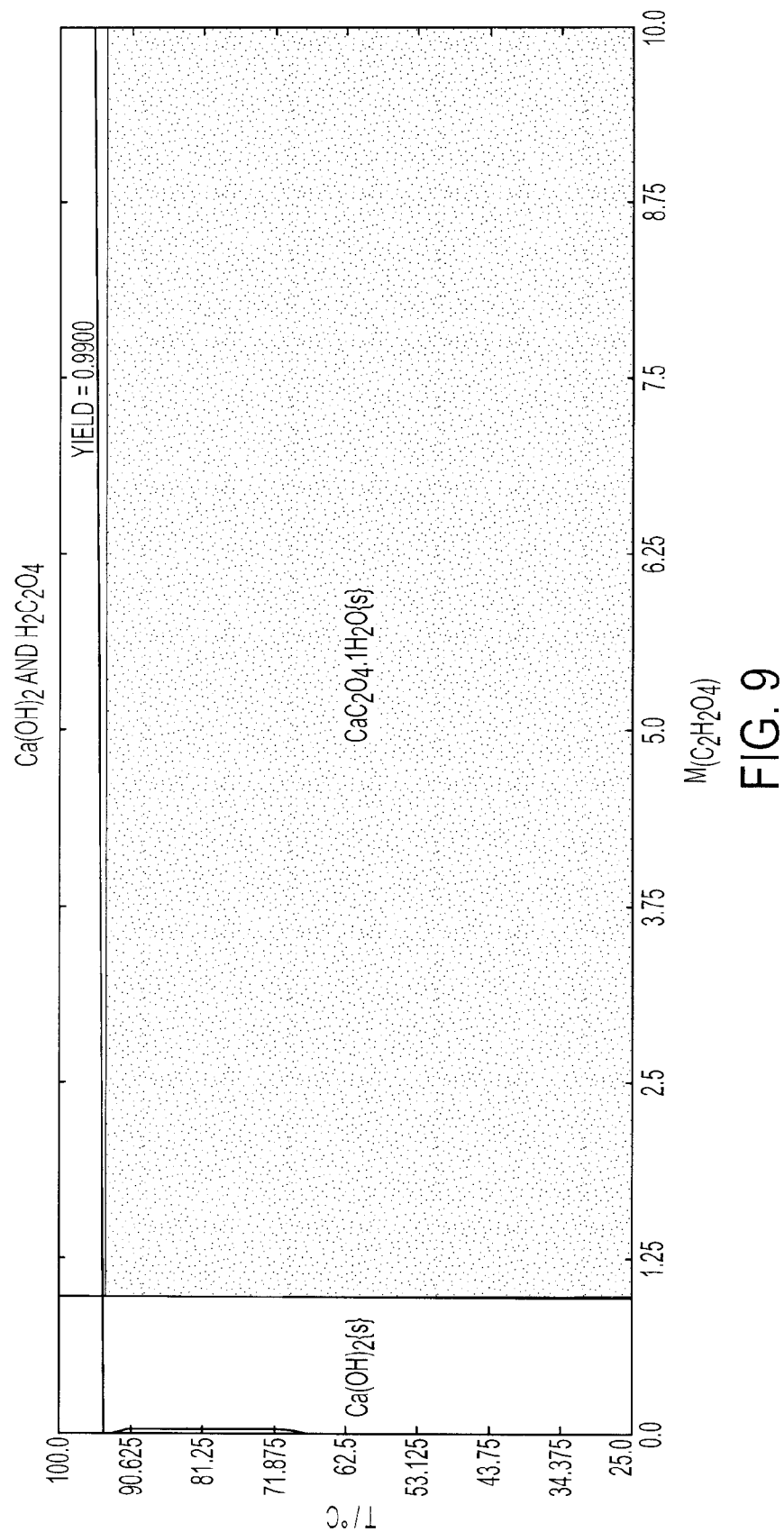
FIG. 9 provides a $Ca(OH)_2$ and $C_2H_2O_4$ phase diagram based on thermodynamic computation generated for selection of the reactant species used in the HLPS reaction in one embodiment.

In one embodiment, 2 molecules of CO$_2$ can be sequestered using multi-dentate ligands such as oxalate, C$_2$O$_4^{2-}$. This reactant can comprise two CO$_2$ molecules bonded together through a carbon-carbon (C—C) bond. Simulations were performed on the following oxalate systems to determine feasibility of the above, the their respective results are shown in the figures:

H$_2$C$_2$O$_4$ $$CaSO_4+H_2C_2O_4 \rightarrow CaC_2O_4 \cdot H_2O+H_2SO_4 \quad \text{(FIG. 7)}$$

$$MgO+H_2C_2O_4+2H_2O \rightarrow MgC_2O_4 \cdot 2H_2O+H_2O \quad \text{(FIG. 8)}$$

$$Ca(OH)_2+H_2C_2O_4 \rightarrow CaC_2O_4 \cdot H_2O+H_2O \quad \text{(FIG. 9)}$$

Figure 10:
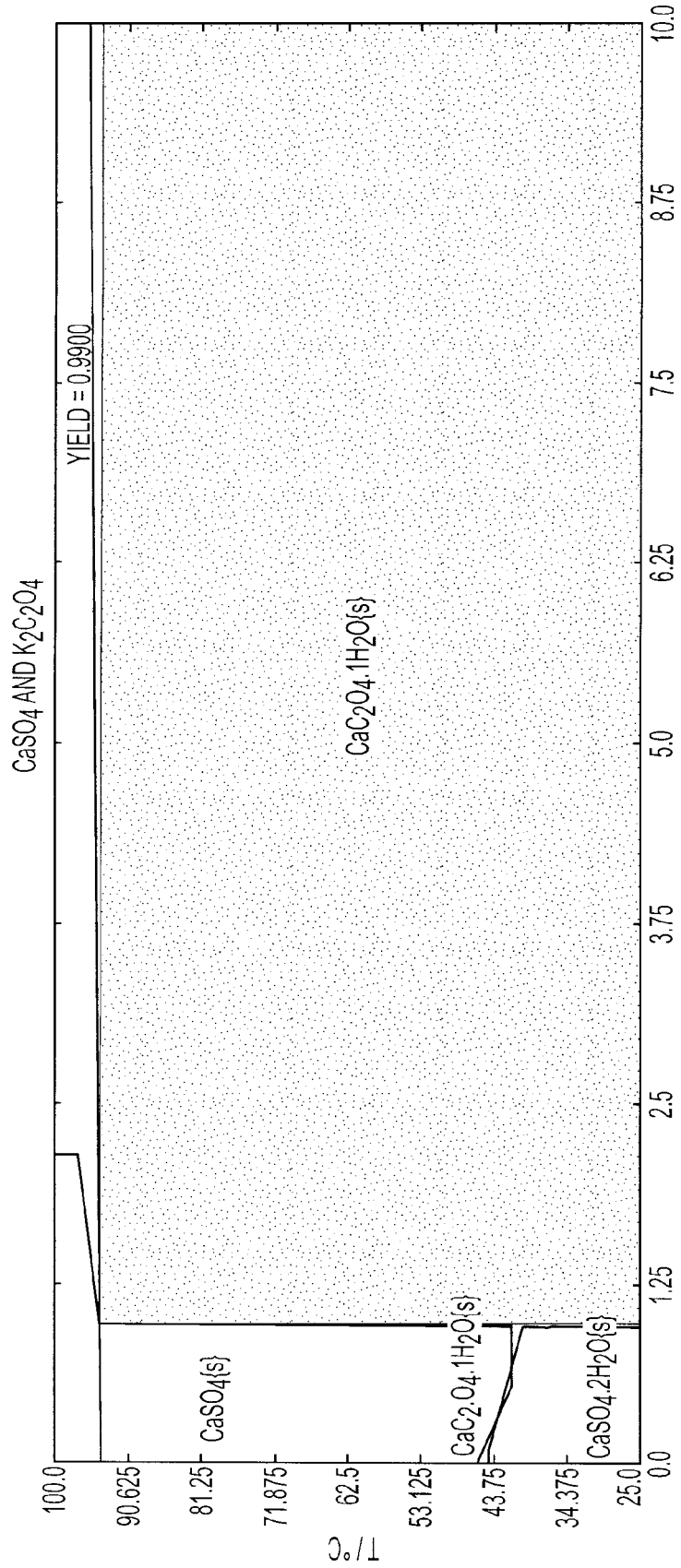
FIG. 10 provides a $CaSO_4$ and $K_2H_2O_4$ phase diagram based on thermodynamic computation generated for selection of the reactant species used in the HLPS reaction in one embodiment.
Figure 11:
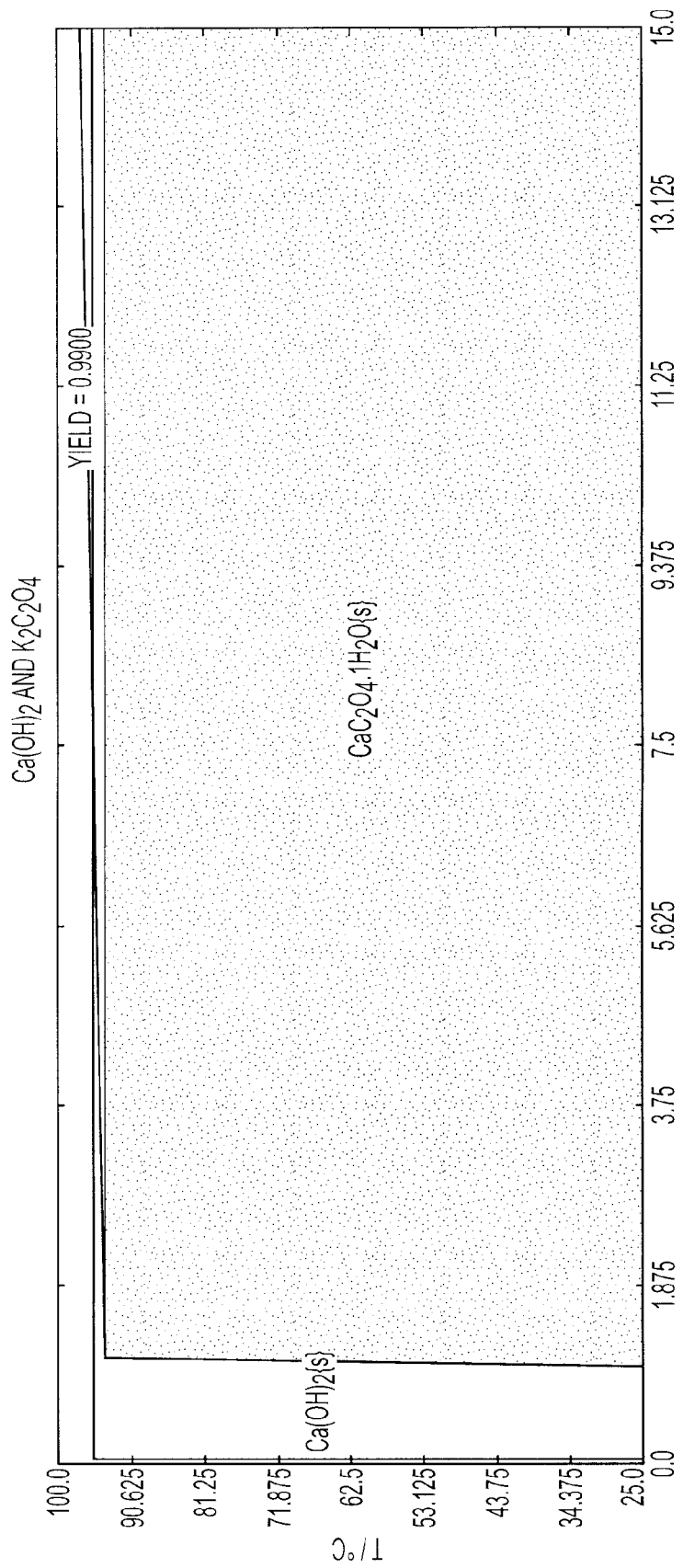
FIG. 11 provides a $Ca(OH)_2$ and $K_2H_2O_4$ phase diagram based on thermodynamic computation generated for selection of the reactant species used in the HLPS reaction in one embodiment.

K$_2$C$_2$O$_4$ $$CaSO_4+K_2C_2O_4+H_2 \rightarrow CaC_2O_4 \cdot H_2O+K_2SO_4 \quad \text{(FIG. 10)}$$

$$Ca(OH)_2+K_2C_2O_4+H_2O \rightarrow CaC_2O_4 \cdot H_2O+2KOH \quad \text{(FIG. 11)}$$

In some embodiments, the reactions involving carbonate can return KOH as reaction product, which can be can be reused for additional reactions, while sequestering the carbonate. In addition, other oxalates such as (NH$_4$)$_2$C$_2$O$_4$ and Na$_2$C$_2$O$_4$ can also be used, as can any oxalate precursor that can provide dissociated oxalate anions. Many oxalates that are stable at room temperature can be used. For example, ferrioxalate, [Fe(C$_2$O$_4$)$_3$]$^{-3}$ can be a soluble anion that can take up to 6 CO$_2$ atoms per iron, which can be desirable for carbon dioxide capture and/or sequestration.

Figure 12:
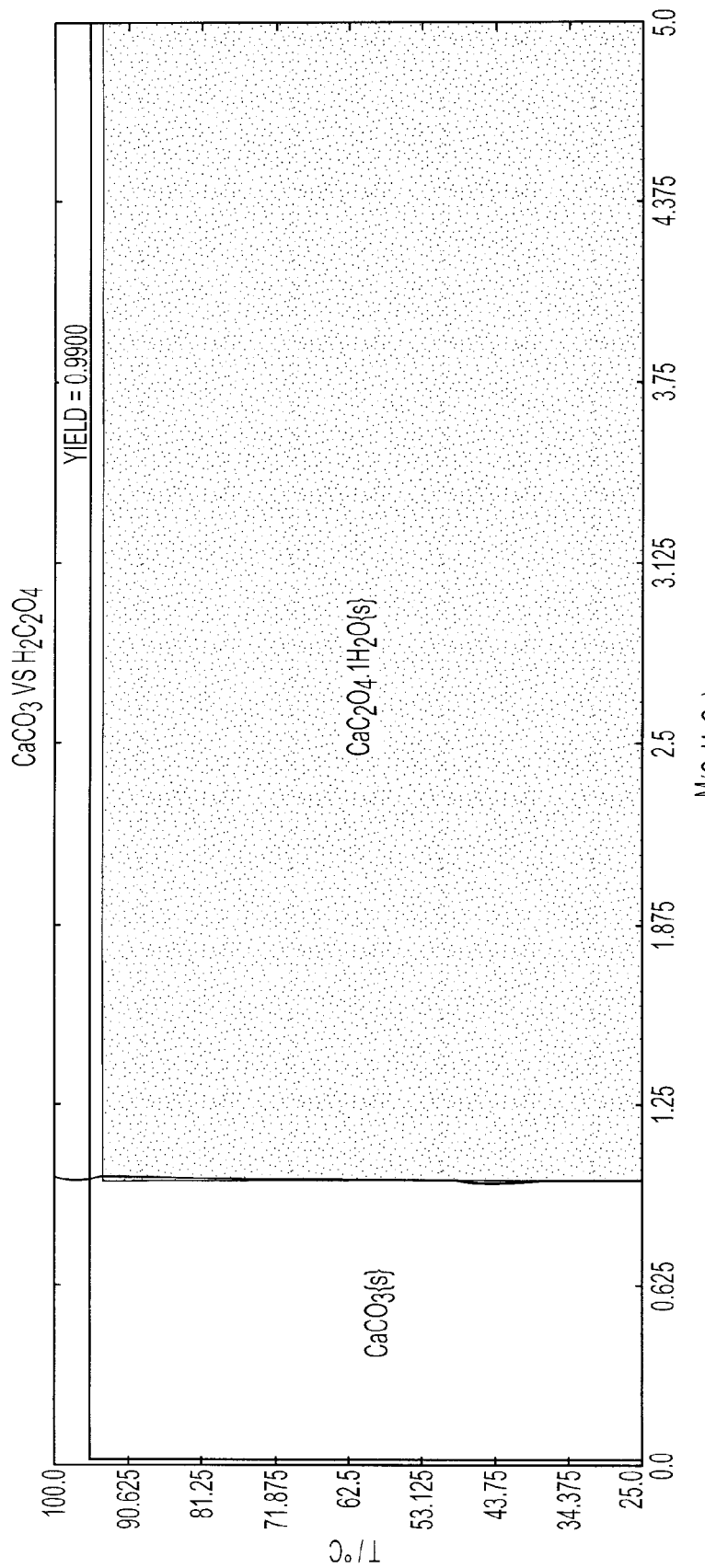
FIG. 12 provides a $CaCO_3$ and $H_2C_2O_4$ phase diagram based on thermodynamic computation generated for selection of the reactant species used in the HLPS reaction in one embodiment.
Figure 13:
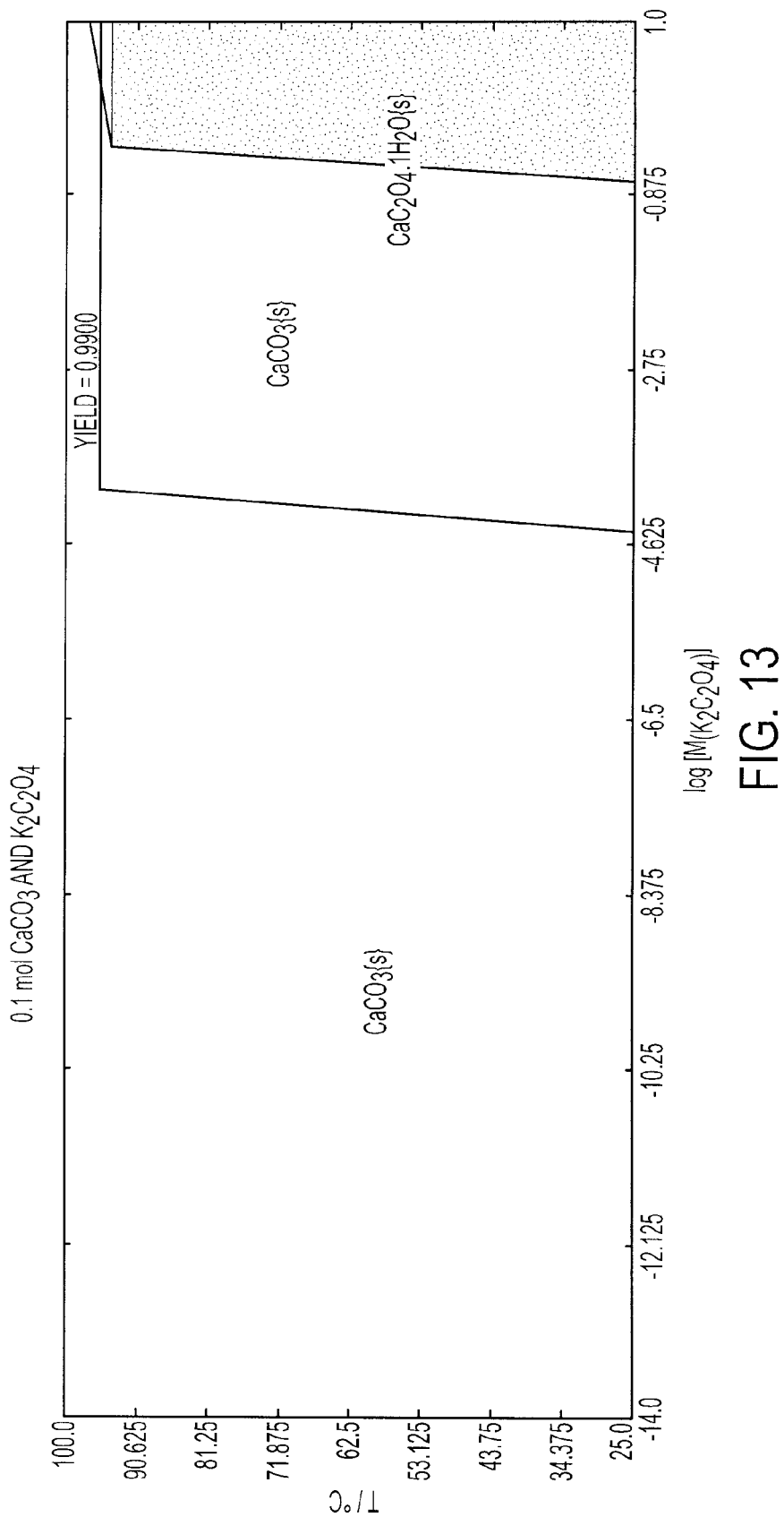
FIG. 13 provides a phase diagram for 0.1 mol $CaCO_3$ and $K_2C_2O$ based on thermodynamic computation generated for selection of the reactant species used in the HLPS reaction in one embodiment.

Oxalate salts can also be useful that they can form oxalates and release carbon dioxide gas or soluble carbonate as follows:

$$CaCO_3+H_2C_2O_4 \rightarrow CaC_2O_4 \cdot H_2O+CO_2 \quad \text{(FIG. 12)}$$

$$CaCO_3+K_2C_2O_4 \rightarrow CaC_2O_4 \cdot H_2O+K_2CO_3 \quad \text{(FIG. 13)}$$

Figure 14:
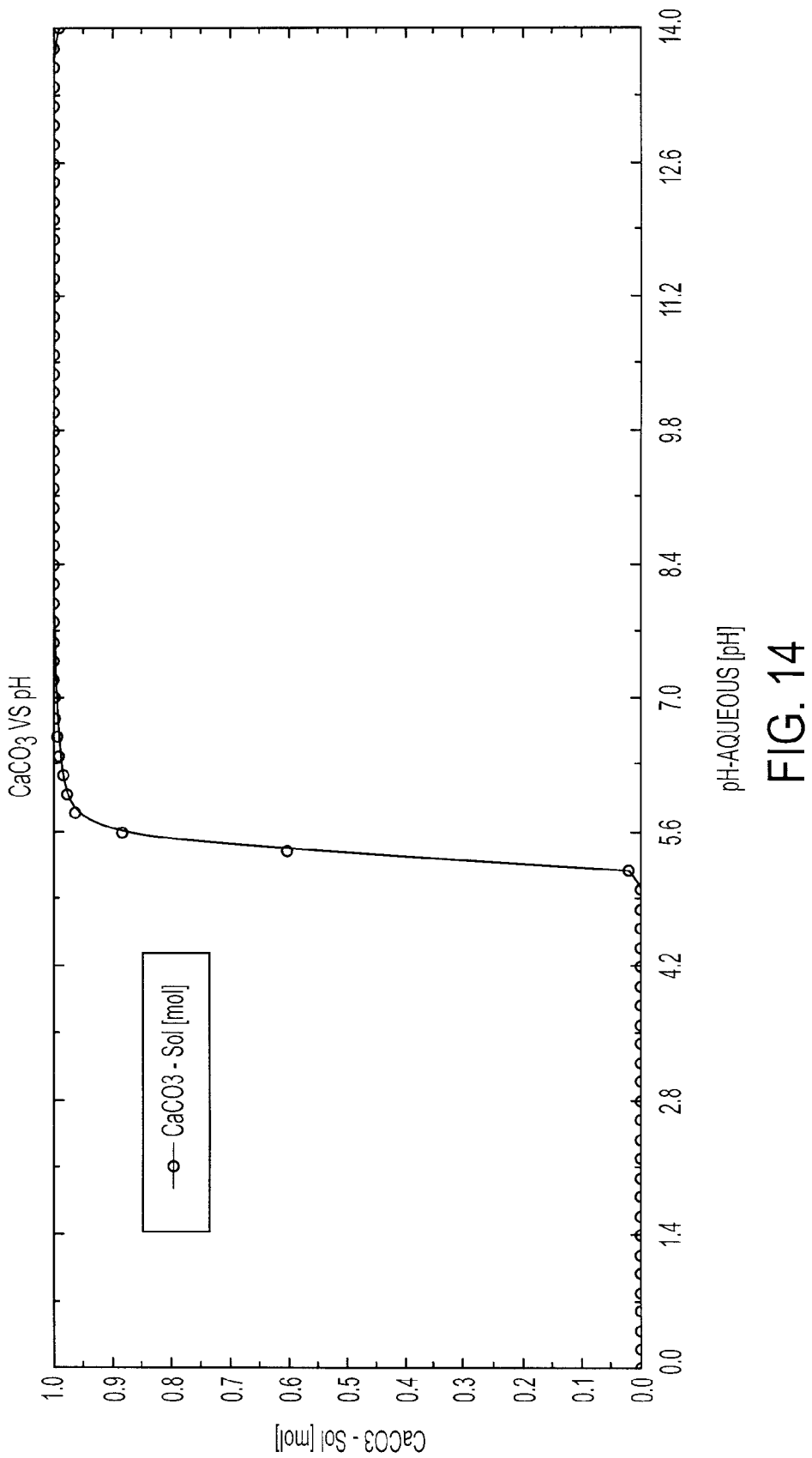
FIG. 14 provides decomposition of a $CaCO_3$ as a function of pH in one embodiment.
Figure 15:
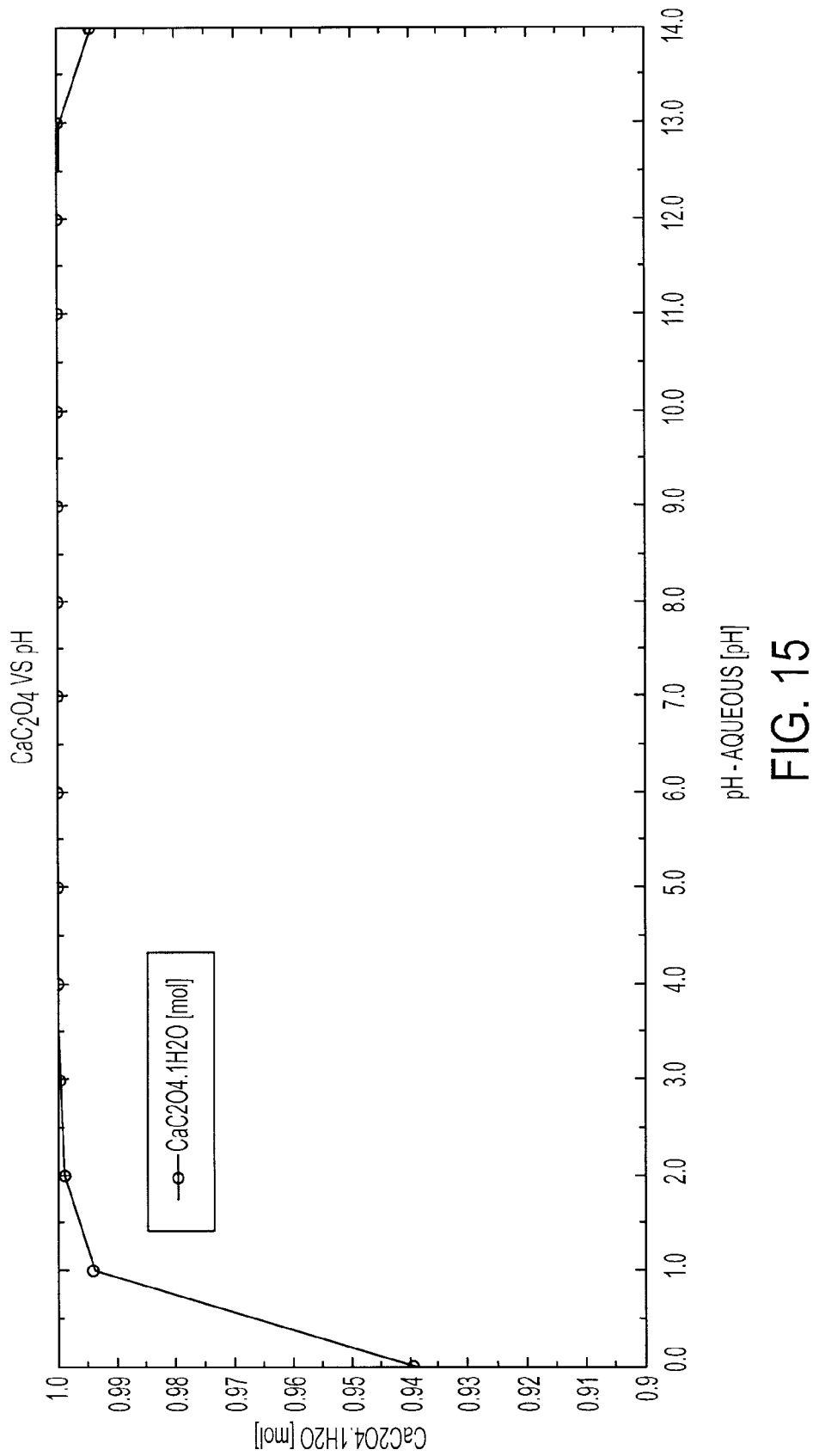
FIG. 15 provides decomposition of a $CaC_2O_4$ as a function of pH in one embodiment.

The use of carboxylate materials can offer enhanced chemical durability over convention cements. For example, conventional marble can begin to decompose at pH of less than about 6 but can endure very high pH levels without decomposition (FIG. 14). For example, when oxalates are used for calcium oxalate monohydrate, pH levels greater than 2 and less than 13 can be endured without decomposition (FIG. 15). The lack of a hydraulic bond can also make it less susceptible to salts used to de-ice cold surfaces.

Applications

One advantage of forming ceramics while capturing and/or sequestering greenhouse gases by HLPS processes is the versatility of the processes. For example, the reactions can be initiated at any time, allowing rapid on-site installation of structures. For example, steam-roller type devices can be used to compact powder and subsequently heat the system, while mixtures of steam and CO$_2$ initiate the sintering reaction. Alternatively, carbonate solutions can be injected into porous beds followed by roller-based consolidation and heating. Casting forms can comprise polymer liners that waveguide microwave energy to heat the water locally to initiate and complete the reaction, where local pressures in the compacted structures can correspond to sub- or super-critical reaction conditions. This versatility can allow construction projects to have little or no time required for curing of the materials. Also, the ability of HLPS processes to add water on-site can reduce the weight of construction materials needed for delivery, thereby reducing cost and energy consumption. Furthermore, in HLPS water can be used as a solvent for the infiltrating medium, rather than a reactant, such as in conventional cement. In particular, water in HLPS can be either reused or returned to the ecosystem.

In one embodiment, the gas capture and sequestration processes can be combined in one single process. For example, the a greenhouse gas can be captured by a reagent capable of reacting with the greenhouse gas. Subsequently, the captured gas (then in aqueous form) can become a reagent in the solution, which then act as an infiltrating medium, as described previously, to sequester the gas. Alternatively, a capturing process is not used prior to sequestration. For example, the infiltrating medium can come readily available with at least a greenhouse gas dissolved, and thus only sequestration of the greenhouse gas is used in this embodiment. The medium can be a commercially available product, if desired.

In one embodiment, the ability to construct shrinkage-free processing can enable formation of a wide range of multi-component structures, wherein the components other than the bonding phase can reside passively in the structure. Such components can be gravel and sand, which can provide a strong percolative network that can be reinforced by the interconnected network of bonded carbonate materials that pervades through the pore structure of gravel and sand. Other structures such as steel rebar can also be incorporated, where interfacial reactions can provide additional reinforcement. Soluble silicate derived from gravel and sand can promote this reaction with steel, as well as promote the formation of other silicate compounds that further contribute the bonding phases in the carbonate-based composite structure. The absence of shrinkage can also promote the embedding of devices in low stress environment to facilitate real-time monitoring of the mechanical stability of the material as well as stress-state.

One additional advantage of the product described herein can include fire resistance, particular for the carbonates. Carbonates, such as calcium carbonate do not decompose until substantially higher temperatures are reached (about 800 to 1000° C., depending on CaCO$_3$ particle size and partial pressure of CO$_2$—p$_{CO2}$)

Inert materials, such as inorganic reflective, colorant, opacifier, or luminescent particles, can also be incorporated in these carboxylate ceramics. For example, the decomposition of FeTiO$_3$, as mentioned earlier, can be used to make composite building materials from titania and FeCO$_3$.

Post-Combustion Carbon Capture

Carboxylates such as metal carbonates and metal oxalates can be used in post-combustion carbon dioxide capture in a HLPS process. Carbonate ions can be made from a CO$_2$ molecule via a fast reaction as follows:

$$CO_2+2OH \rightarrow CO_3^{2-}+H_2O.$$

Note that water is generated as a co-product. Thus, if large quantities of CO$_2$ are processed, the generation of water can also be beneficial as water becomes scarce. In one embodiment, 1-2 inorganic cations can be used for each carbonate ion as follows:

$$xM^{z+}+CO_3^{2-} \rightarrow M_x(CO_3).$$

For example when the inorganic ion is sodium, the ratio of CO$_2$ to inorganic product on an atomic percent basis is 1:2, whereas when the inorganic ion is calcium, the ratio of CO$_2$ to inorganic product on an atomic percent basis is 1:1. Monovalent carbonates can be desirable because they can be highly soluble in water.

Metal oxalates also be used. Two molecules of CO$_2$ are used to make one oxalate ion as follows:

$$2CO_2+2e^- \rightarrow C_2O_4^{2-}$$

This ion can be made either from carbon monoxide or biologically from CO$_2$ in a wide range of vegetation. The ability of oxalate to capture 2 molecules of CO$_2$ for each oxalate anion can provide other possibilities for CO$_2$ capture.

For example, minerals, such as limestone, generally can decompose to release $CO_2$ as follows:

$$CaCO_3 \rightarrow CaO+CO_2$$

Alternatively, carbonate can be decomposed with the addition of oxalate:

$$CaCO_3+K_2C_2O_4+H_2O \rightarrow CaC_2O_4.H_2O+K_2CO_3$$

Thus, $CO_3^{2-}$ can be recovered from limestone and generate a $K_2CO_3$ precursor that can be further used in hydrothermal sintering, as opposed to generating $CO_2$ gas that would require capture. This reaction can also occur with the addition of oxalic acid:

$$CaCO_3+H_2C_2O_4 \rightarrow CaC_2O_4.H_2O+CO_2.$$

Calcium hydroxide is generally known to be manufactured by hydrating calcium oxide in water. Calcium hydroxide can be converted to carbonate, as follows:

$$Ca(OH)_2+CO_2 \rightarrow CaCO_3+H_2O$$

Thus, this reaction is carbon neutral, as it consumes the $CO_2$ once released to form CaO. However, if oxalate is used, then the reaction can be carbon consuming as follows:

$$Ca(OH)_2+H_2C_2O_4 \rightarrow CaC_2O_4.H_2O+H_2O$$

or $$Ca(OH)_2+K_2C_2O_4+H_2O \rightarrow CaC_2O_4.H_2O+2KOH.$$

In one embodiment, the caustic base generated in the reaction can be further used as a $CO_2$ capture solution. Thus, one HLPS process of $CO_2$ capture can begin another HLPS process.

Post-combustion carbon capture solution can be based on soluble hydroxide such as caustic soda. Soluble hydroxide can be used as a capture solution via a scrubbing tower.

One advantage of the proposed process is that it can recover all of the heat value of the flue gas, operate at high temperatures, react with $CO_2$ quantitatively and utilize raw materials that can be extracted from any coastline, which also can be convenient for shipping. The $CO_2$ footprint can be very small unless the flue gas is unable to supply the needed heat value for evaporation and carbonation.

NON-LIMITING WORKING EXAMPLES

Example 1

Calcium Carbonate from Calcium Hydroxide and Potassium Carbonate

Calcium oxide powder, ~5 g, was reacted with ~100 ml de-ionized water to form $Ca(OH)_2$ in Teflon jar at room temperature. The calcium hydroxide and water mixture was cooled down to room temperature. It was then shaken and poured into colloidal press until the reservoir was filled roughly around 75%. A load of 7000 pounds was applied on the colloidal press slowly. A Teflon® jar was filled with 200 ml of de-ionized water and 30 g of $K_2CO_3$ was dissolved in it. Wet $Ca(OH)_2$ pellet was placed on a Teflon tray and placed in the Teflon jar. The cap of the jar was closed and kept at room temperature for 4 days. The pellet was then taken out and rinsed with de-ionized water. The reaction product was subjected to x-ray diffraction and was found to comprise mainly $CaCO_3$ with a small amount of $Ca(OH)_2$. The sample maintained its shape and had sufficient mechanical strength to resist fracture.

Example 2

Calcium Oxalate Monohydrate from Calcium Hydroxide and Oxalic Acid

Calcium oxide powder, ~5 g, was reacted with ~100 ml de-ionized water to form $Ca(OH)_2$ in a Teflon® jar at room temperature. The calcium hydroxide and water mixture was cooled down to room temperature. It was then shaken and poured into a 1" diameter colloidal (filter) press until the reservoir was filled roughly around 75%. A load of 7000 pounds was applied on the colloidal press slowly. The Teflon jar was filled with 200 ml of de-ionized water and 30 g of $H_2C_2O_4$ were mixed. The wet $Ca(OH)_2$ pellet was placed on a Teflon® tray and placed in the Teflon® jar. The cap of the jar was closed and kept at room temperature for 4 days. The pellet was then taken out and rinsed with de-ionized water. X-ray diffraction revealed the presence of both $CaC_2O_4.H_2O$ and $Ca(OH)_2$. The sample maintained its shape and size as pressed and did not change dimensions after hydrothermal liquid phase sintering The material is mechanically stable. A more complete reaction and even stronger material might result if $Ca(OH)_2$ was mixed with oxalic acid during pressing rather than using pure water.

The preceding examples and preferred embodiments are meant to illustrate the breadth of the invention and should not be taken to limit the invention in any way. Other embodiments will surely be apparent to those of ordinary skill in view of the detailed descriptions provided in this disclosure. Such other embodiments are considered to fall within the scope and spirit of the invention, which is limited solely by the following claims.

What is claimed:

1. A composition produced by a hydrothermal liquid phase sintering process, the process comprising:
   providing a porous matrix, the porous matrix having a shape, and
   allowing a component of the porous matrix to undergo a reaction with an infiltrating medium to form a first product, the infiltrating medium including a greenhouse gas, a remainder of the porous matrix acting as a scaffold for facilitating the formation of the first product,
   wherein the greenhouse gas is carbon dioxide,
   wherein the first product includes carbonate,
   wherein the composition has a microstructure with an interconnecting network that resembles a net,
   wherein the composition includes the first product and the reminder of the porous matrix, and
   wherein the composition has a decomposition temperature of at least about 800° C.

2. The composition of claim 1, wherein the first product is produced by ion substitution, ion addition, disproportionation, or combinations thereof.

3. The composition of claim 1, wherein the first product is produced by precipitation.

4. The composition of claim 1, wherein the composition is a cement.

5. The composition of claim 1, wherein the porous matrix is derived from a powder.

6. The composition of claim 1, wherein the composition has a homogenous microstructure.

* * * * *